United States Patent
Lo et al.

(10) Patent No.: US 11,190,233 B2
(45) Date of Patent: Nov. 30, 2021

(54) SYSTEMS AND METHODS FOR DETECTING, MONITORING, AND MITIGATING THE PRESENCE OF A DRONE USING FREQUENCY HOPPING

(71) Applicant: SkySafe, Inc., San Diego, CA (US)

(72) Inventors: Brandon Fang-Hsuan Lo, San Diego, CA (US); Scott Torborg, San Diego, CA (US); Chun Kin Au Yeung, San Diego, CA (US)

(73) Assignee: SKYSAFE, INC., San Diego, CA (US)

( * ) Notice: Subject to any disclaimer, the term of this patent is extended or adjusted under 35 U.S.C. 154(b) by 0 days.

(21) Appl. No.: 16/886,482

(22) Filed: May 28, 2020

(65) Prior Publication Data

US 2020/0382156 A1 Dec. 3, 2020

Related U.S. Application Data

(60) Provisional application No. 62/921,033, filed on May 29, 2019.

(51) Int. Cl.
*H04B 1/7136* (2011.01)
*B64C 39/02* (2006.01)
(Continued)

(52) U.S. Cl.
CPC ......... *H04B 1/7136* (2013.01); *B64C 39/024* (2013.01); *G05D 1/0022* (2013.01);
(Continued)

(58) Field of Classification Search
CPC .................................................. H04B 1/7136
(Continued)

(56) References Cited

U.S. PATENT DOCUMENTS

| | | | |
|---|---|---|---|
| 7,173,958 B2 * | 2/2007 | Ho | H04B 1/70735 375/145 |
| 7,873,095 B1 * | 1/2011 | Stockmaster | H04K 3/28 375/132 |

(Continued)

FOREIGN PATENT DOCUMENTS

WO   WO 2018/125686 A2   7/2018

OTHER PUBLICATIONS

International Search Report dated Sep. 8, 2020, issued in corresponding international Application No. PCT/US2020/034969, filed May 28, 2020.

(Continued)

*Primary Examiner* — Lihong Yu
(74) *Attorney, Agent, or Firm* — Knobbe Martens Olson & Bear LLP

(57) ABSTRACT

Systems and methods for detecting, monitoring, and mitigating the presence of a drone are provided herein. In one aspect, a system for detecting presence of a one or more drones includes a radio-frequency (RF) receiver configured to receive an RF signal transmitted between a drone and a controller. The system can further include a processor and a computer-readable memory in communication with the processor and having stored thereon computer-executable instructions to cause the at least one processor to receive a set of samples from the RF receiver for a time interval, the set of samples comprising samples of the first RF signal, obtain a parameter model of the first frequency hopping parameters, and fit the parameter model to the set of samples.

20 Claims, 13 Drawing Sheets

(51) Int. Cl.
G05D 1/00 (2006.01)
G06F 17/18 (2006.01)
H04B 1/7143 (2011.01)
H04B 1/7156 (2011.01)

(52) U.S. Cl.
CPC ............ G06F 17/18 (2013.01); H04B 1/7143 (2013.01); H04B 1/7156 (2013.01); B64C 2201/122 (2013.01); B64C 2201/146 (2013.01)

(58) Field of Classification Search
USPC ........................................................ 375/132
See application file for complete search history.

(56) References Cited

U.S. PATENT DOCUMENTS

| | | | |
|---|---|---|---|
| 9,275,645 | B2 | 3/2016 | Hearing et al. |
| 9,529,360 | B1 | 12/2016 | Melamed et al. |
| 9,763,177 | B1 | 9/2017 | Baskaran et al. |
| 9,996,079 | B2 | 6/2018 | Magy et al. |
| 10,051,475 | B2 | 8/2018 | Shattil et al. |
| 10,237,743 | B2 | 3/2019 | Shattil et al. |
| 10,271,233 | B2 | 4/2019 | Kleinbeck et al. |
| 10,317,506 | B2 | 6/2019 | Seeber et al. |
| 2002/0176385 | A1* | 11/2002 | Huh .................. H04B 1/715 370/335 |
| 2017/0148332 | A1 | 5/2017 | Ziemba et al. |
| 2018/0081355 | A1 | 3/2018 | Magy et al. |
| 2019/0268036 | A1* | 8/2019 | Macleod ............... G01S 19/29 |

OTHER PUBLICATIONS

Lo et al., "HopSAC: Frequency Hopping Parameter estimation Based on Random Sample Consensus for Counter-Unmanned Aircraft Systems", MILCOM 2019—2019 IEEE Military Communications Conference (MILCOM), IEEE Nov. 12, 2019, pp. 355-360.
D. Angelosante, G. B. Giannakis, and N. D. Sidiropoulos, "Estimating multiple frequency-hopping signal parameters via sparse linear regression,"IEEE Transactions on Signal Processing, vol. 58, No. 10, pp. 5044-5056, Oct. 2010.
Beyme et al. "Efficient Computation of DFT of Zadoff-Chu sequences," Elec. Letters (2009) vol. 45, No. 9, pp. 461-463.
"Drone Market Is Estimated To Expand At a Healthy CAGR in the Upcoming Forecast 2025," [Online] Sep. 13, 2019 https://www.americanewshour.com/?s=Drone+Market+Is+Estimated+To+Expand+At+a+Healthy+CAGR+in+the+Upcoming+Forecast+2025.
"Evolved Universal Terrestrial Radio Access (E-UTRA); Physical Channels and Modulation," 3GPP TS 36.211 (2018) vol. 15.0.
M. A. Fischler and R. C. Bolles, "Random sample consensus: A paradigm for model fitting with applications to image analysis and automated cartography," Communications of the ACM, vol. 24, No. 6, pp. 381-395, Jun. 1981.
Federal Aviation Administration, "FAA aerospace forecasts fiscal years 2019-2039," 2019. [Online]. Available: https://www.faa.gov/data research/aviation/aerospace forecasts/.
"FCC Part 15.247 Test Report for GL300A (FCC ID:SS3-GL3001501)," Tech. Rep., Apr. 2015. [Online]. Available: https://fccid.io/SS3-GL3001501/Test-Report/Test-Report-Rev-2599009.
"FCC Part 15.247 Test Report for GL300F (FCC ID:SS3-GL300F1609)," Tech. Rep., Sep. 2016. [Online]. Available: https://fccid.io/SS3-GL300F1609/Test-Report/Test-Report-3155813.
"FCC Part 15.247 Test Report for GL300C (FCC ID: SS3-GL3001510)," Tech. Rep., Oct. 2015. [Online]. Available: https://fccid.io/SS3-GL3001510/RF-Exposure-lnfo/SAR-Test-Report-2805129.
Gul et al. "Timing and Frequency Synchronization for OFDM Downlink Transmissions Using Zadoff-Chu Sequences," IEEE Trans. On Wireless Comm. (2015) vol. 14, No. 3, pp. 1716-1729.
International Search Report dated Jul. 14, 2020, issued in corresponding International Application No. PCT/US2020/032391, filed May 11, 2020.
Kim et al. "A delay-robust random access preamble detection algorithm for LTE system," Proc. RWS (2012) pp. 7578.
Liang et al. "The Research on Random Access Signal Detection Algorithm in LTE Systems," 2013 $5^{th}$ IEEE Intl. Symp. On Microwave, Ant. Prop. And EMC Tech. for Wireless Comm. (2013) pp. 115118.
X. Liu, N. D. Sidiropoulos, and A. Swami, "Joint hop timing and frequency estimation for collision resolution in FH networks," IEEE Transactions on Wireless Communications, vol. 4, No. 6, pp. 3063-3074, Nov. 2005.
Nelson et al. "The View From Above: A Survey of the Public's Perception of Unmanned Aerial Vehicles and Privacy," J. of Urban Tech. (2019) vol. 26, issue 1, pp. 83-105.
Tao et al. "Improved Zadoff-Chu Sequence Detection in the Presence of Unknown Multipath and Carrier Frequency Offset," IEEE Comm. Letters (2019) vol. 22, No. 5, pp. 922-925.
Y. Wang, C. Zhang, and F. Jing, "Frequency-hopping signal parameters estimation based on orthogonal matching pursuit and sparse linear regression,"IEEE Access, vol. 6, pp. 54 310-54 319, Sep. 2018.
Yu et al. "Random access algorithm of LTE TDD system based on frequency domain detection," Proc. Int. Conf. Semantics, Knowl. Grid (2009) pp. 346350.
L. Zhao, L. Wang, G. Bi, L. Zhang, and H. Zhang, "Robust frequency-hopping spectrum estimation based on sparse bayesian method," IEEE Transactions on Wireless Communications, vol. 14, No. 2, pp. 781-793, Feb. 2015.
Mohebbi, Ali, et al., Novel Coarse Timing Synchronization Methods in OFDM Systems Using Fourth Order Statistics, IEEE Transactions on Vehicular Technology, vol. 64, No. 5, May 2015.
Second Written Opinion dated Apr. 19, 2021, issued in corresponding international application No. PCT/US2020/032319, filed May 11, 2020.
Simon et al., "On the Implementation and Performance of Single and Double Differential Detection Schemes", IEEE Transactions On Communications, IEEE Service Center, Piscataway, NJ. USA, vol. 40, No. 2, Feb. 1, 1992 (Feb. 1, 1992), pp. 278-291.
International Preliminary Report on Patentability issued in application No. PCT/US2020/032391, dated Jul. 19, 2021.

* cited by examiner

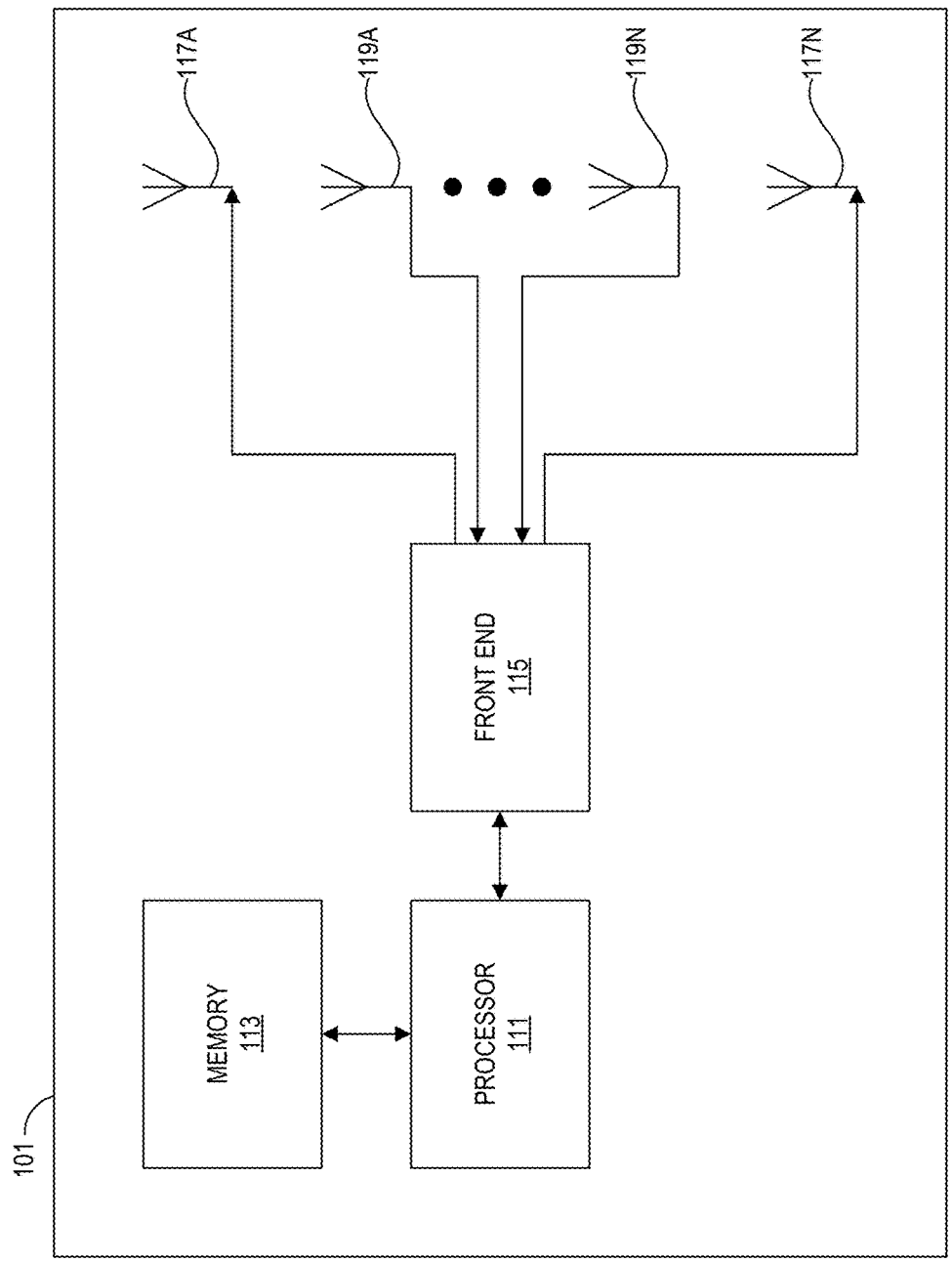

SYSTEMS AND METHODS FOR DETECTING, MONITORING, AND MITIGATING THE PRESENCE OF A DRONE USING FREQUENCY HOPPING

CROSS-REFERENCE TO RELATED APPLICATION(S)

This application claims the benefit of U.S. Provisional Application No. 62/921,033, filed May 29, 2019, which is hereby incorporated by reference in its entirety.

BACKGROUND

Technological Field

The systems and methods disclosed herein are directed to detecting, monitoring, and mitigating the presence of a drone. More particularly, the systems and methods can be used to detect the presence of a plurality of drones employing radio-frequency (RF) communications.

Description of the Related Technology

In recent years, Unmanned Aircraft Systems (UAS), more commonly known as drones, have been used extensively in a large number of exciting and creative applications, ranging from aerial photography, agriculture, product delivery, infrastructure inspection, aerial light shows, and hobbyist drone racing. Despite the usefulness of drones in many applications they also pose increasing security, safety, and privacy concerns. Drones are being used to smuggle weapons and drugs across borders. The use of drones near airports presents safety concerns, which may require airports to shut down until the surrounding airspace is secured. Drones are also used as a tool of corporate and state espionage activities. Thus, there is demand for an effective Counter-Unmanned Aircraft System (CUAS) solution to detect and monitor drones and mitigate the threat of drones when necessary.

SUMMARY

The systems, methods and devices of this disclosure each have several innovative aspects, no single one of which is solely responsible for the desirable attributes disclosed herein.

In one aspect, there is provided a system for detecting presence of a one or more drones, the system comprising: a radio-frequency (RF) receiver configured to receive a first RF signal transmitted between a first drone and a first drone controller, the first RF signal including a first frequency hopping sequence defined by a plurality of first frequency hopping parameters; a processor; and a computer-readable memory in communication with the processor and having stored thereon computer-executable instructions to cause the at least one processor to: receive a sequence set of samples from the RF receiver for a time interval, the set of samples comprising samples of the first RF signal, obtain a parameter model of the first frequency hopping parameters, fit the parameter model to the sequence set of samples by iterating over the following: randomly selecting a first plurality of the samples from the sequence set of samples, estimating the plurality of first frequency hopping parameters based on the selected first plurality of the samples, constructing a first instance of the parameter model based on the estimated plurality of first frequency hopping parameters, and classifying the first plurality of the samples as inliers or outliers by evaluating fitting errors between the first plurality of the samples and the constructed first instance of the parameter model, selecting one of the first instances of the parameter model based on the inliers and outliers for each of the constructed first instances of the parameter model, and identifying the first drone based on the selected first instance of the parameter model.

In another aspect, there is provided a method for detecting presence of a drone, the method comprising: receiving a set of samples for a time interval, the set of samples comprising samples of a first RF signal transmitted between a first drone and a first drone controller, the first RF signal including a first frequency hopping sequence defined by a plurality of first frequency hopping parameters; obtaining a parameter model of the first frequency hopping parameters; fitting the parameter model to the set of samples by iterating over the following: randomly selecting a first plurality of the samples from the set of samples, estimating the plurality of first frequency hopping parameters based on the selected first plurality of the samples, constructing a first instance of the parameter model based on the estimated plurality of first frequency hopping parameters, and classifying the first plurality of the samples as inliers or outliers by evaluating fitting errors between the first plurality of the samples and the constructed first instance of the parameter model; selecting one of the first instances of the parameter model based on the inliers and outliers for each of the constructed first instances of the parameter model; and identifying the first drone based on the selected first instance of the parameter model.

In yet another aspect, there is provided a non-transitory computer readable storage medium having stored thereon instructions that, when executed, cause a computing device to: receive receiving a set of samples for a time interval, the set of samples comprising samples of a first RF signal transmitted between a first drone and a first drone controller, the first RF signal including a first frequency hopping sequence defined by a plurality of first frequency hopping parameters; obtain a parameter model of the first frequency hopping parameters; fit the parameter model to the set of samples by iterating over the following: randomly selecting a first plurality of the samples from the set of samples, estimating the plurality of first frequency hopping parameters based on the selected first plurality of the samples, constructing a first instance of the parameter model based on the estimated plurality of first frequency hopping parameters, and classifying the first plurality of the samples as inliers or outliers by evaluating fitting errors between the first plurality of the samples and the constructed first instance of the parameter model; select one of the first instances of the parameter model based on the inliers and outliers for each of the constructed first instances of the parameter model; and identify the first drone based on the selected first instance of the parameter model.

BRIEF DESCRIPTION OF THE DRAWINGS

FIG. 2A illustrates an example drone detection system from FIG. 1 which can be used to detect, monitor, and/or mitigate drones in accordance with aspects of this disclosure.

DETAILED DESCRIPTION

The fast growth of drone applications in industrial, commercial and consumer domains in recent years has caused great security, safety and privacy concerns. For this reason, demand has been growing for systems and technique for drone detection, monitoring, and mitigation.

CUAS systems (or simply "drone detection systems") may operate using multiple stages. In a first stage, the drone detection system detects the presence of a drone and determine whether the drone is a friend or a foe. The drone detection system can accomplish this by eavesdropping or monitoring the signals exchanged between the drone and the controller. Certain drones can be configured to wirelessly communicate with a controller using a frequency hopping protocol. Certain aspects of this disclosure may relate to detecting frequency hopping parameters which can be used to model frequency hopping-based communications between the drone and the controller.

Small drones, which are widely used in recreational and commercial applications, have caused alarming concerns of public safety and homeland security due to frequently reported unauthorized drone incidents in recent years. To effectively disable potential threats from frequency hopping drones and controllers, drone detection systems may be configured to estimate the parameters of the frequency hopping signals with high precision and low complexity for real-time responses.

Therefore, it is desirable to provide a model parameter estimation method to meet all these requirements for drone detection systems. Aspects of this disclosure relate to a hopping parameter estimation method based on random sample consensus (which can be referred to as "HopSAC") to address the above described challenges. Advantageously, aspects of this disclosure can accurately estimate frequency hopping parameters using a relatively small set of samples (in some instances with as few as two samples) in real-time. In one example, the methods disclosed herein can estimate the parameters of a linear frequency hopping sequence and achieve high multiple target detection performance with low implementation complexity that can be realized in real time. Simulation results show that the estimation techniques described herein significantly outperform linear Least Squares methods in achieving exceptional accuracy of model parameter estimation under the impact of gross errors, timing errors, and/or multiple drone targets.

Figure 1:
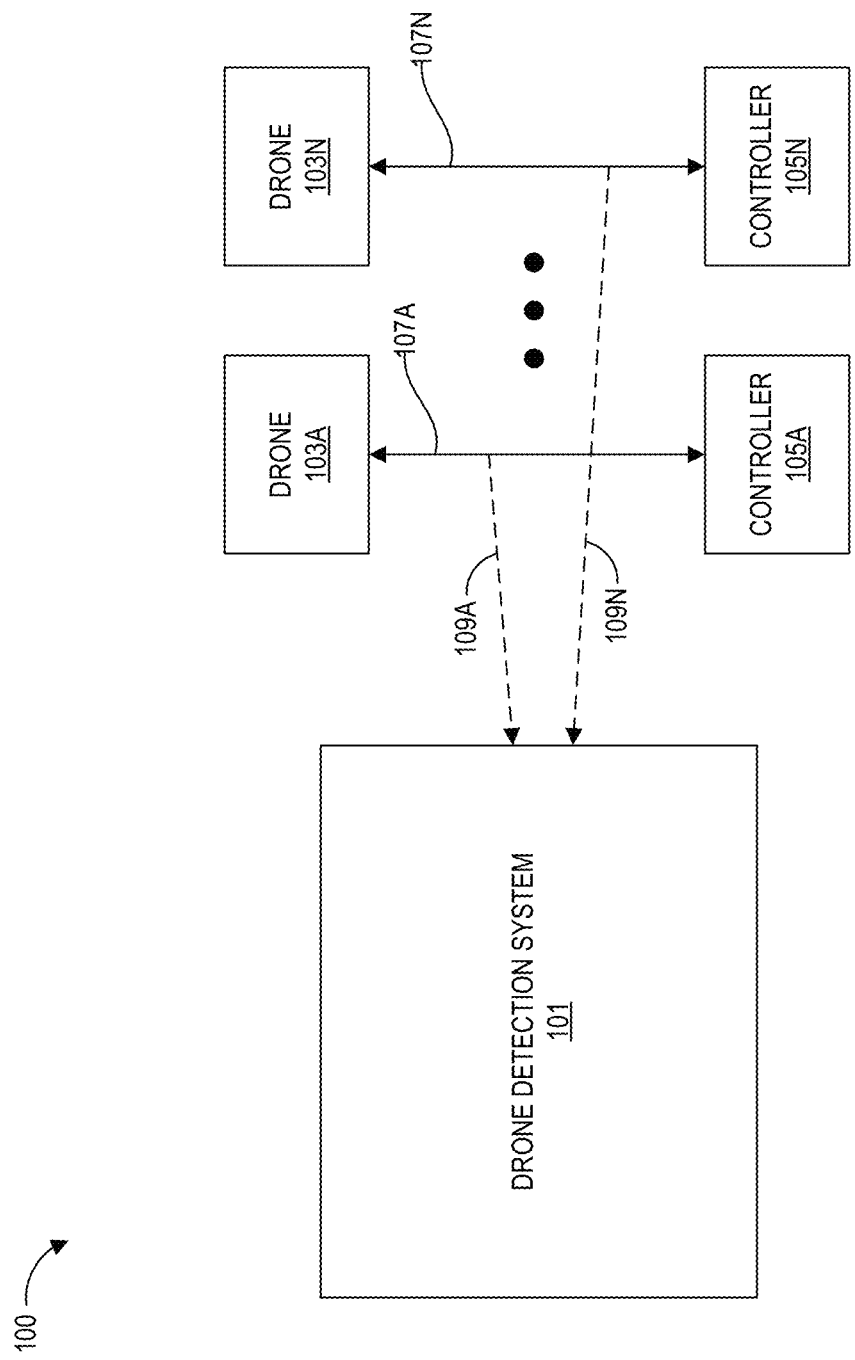
FIG. 1 illustrates an example environment including a drone detection system in accordance with aspects of this disclosure.
Figure 2B:
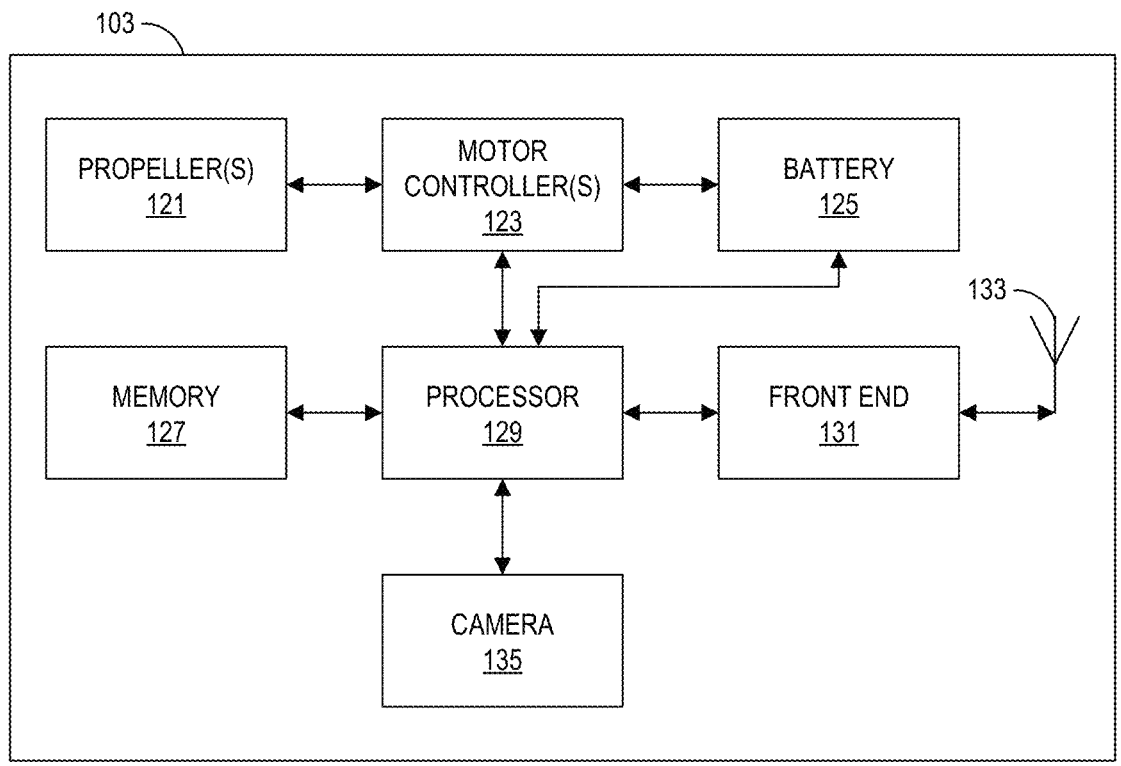
FIG. 2B illustrates an example drone from FIG. 1 which can be detected with the drone detection system of FIG. 2A in accordance with aspects of this disclosure.
Figure 2C:
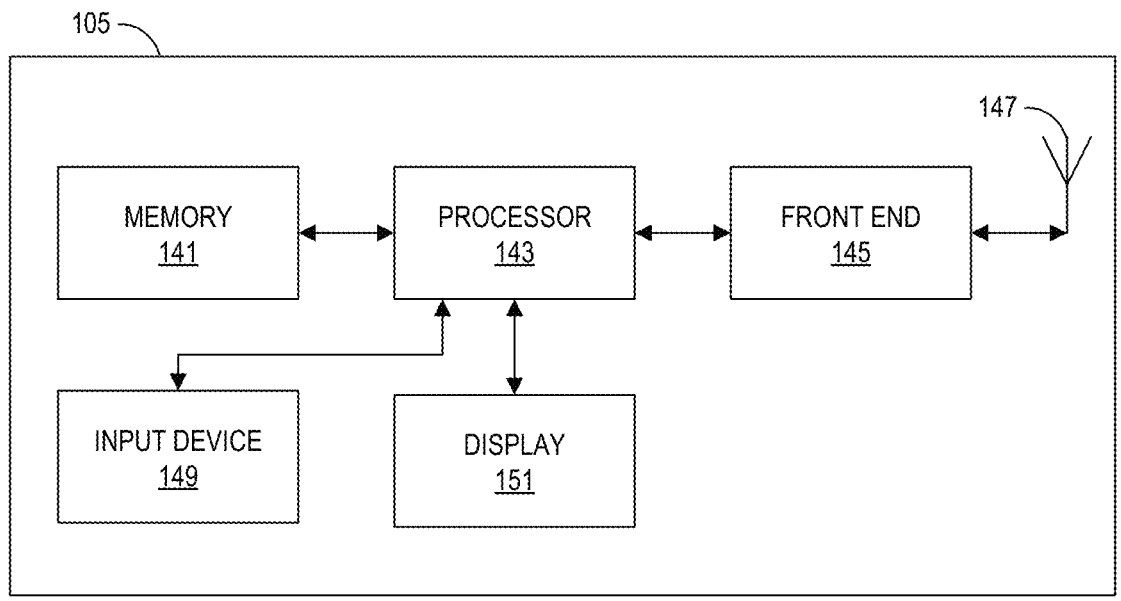
FIG. 2C illustrates an example controller from FIG. 1 which can be used to control the drone in accordance with aspects of this disclosure.

FIG. 1 illustrates an example environment 100 including a drone detection system 101 in accordance with aspects of this disclosure. In certain embodiments, the environment 100 includes the drone detection system 101, one or more drones 103A-103N, and one or more drone controllers 105A-105N (or simply "controllers"). An example of the one or more drones 103A-103N is illustrated in FIG. 2B. An example of the one or more controllers 105A-105N is illustrated in FIG. 2C.

In certain embodiments, each of the drones 103A-103N is configured to communicate to a corresponding one of the controllers 105A-105N via an RF signal 107A-107N. Although not illustrated, in some embodiments, a single one of the controllers 105A-105N may be configured to control more than one of the drones 103A-103N.

The drone detection system 101 is configured to receive monitor 109A-109N the communications between the drones 103A-103N and the controllers 105A-105N in order to detect the presence of the drones 103A-103N. For example, the drone detection system 101 may be configured to receive the RF signals 107A-107N being sent between the drones 103A-103N and the controllers 105A-105N in order to monitor 109A-109N the communication between the drones 103A-103N and the controllers 105A-105N. In certain embodiments, once the drone detection system 101 is able to decode the RF signals 107A-107N, the drone detection system 101 may monitor the drones 103A-103N and take certain actions in order to mitigate the potential threat of the drones 103A-103N. For example, as is explained with respect to FIG. 6, the drone detection system 101 may transmit a jamming RF signal to disrupt communication between the detected drone 103A-103N and the controller 105A-105N, and/or spoof the controller 105A-105N by sending a command to the drone 103A-103N to land or otherwise leave the environment 100.

FIG. 2A illustrates an example drone detection system 101 which can be used to detect the presence of the one or more drones 103A-103N in accordance with aspects of this disclosure. In certain embodiments, the drone detection system 101 includes a processor 111, a memory 113, a front end 115, a plurality of transmit antennae 117A-117N, and a plurality of receive antennae 119A-119N. In other embodiments, one or more of the antennae 117A-119N can be used for both transmitting and receiving signals.

In certain embodiments, the drone detection system 101 is configured to receive an RF signal (e.g., the RF signals 107A-107N of FIG. 1) via one of the receive antennae 119A-119N. The one of the receive antennae 119A-119N provides the received RF signal to the front end 115. In certain embodiments, the front end 115 can process the received RF signal into a format that can be read by the processor 111. For example, in certain embodiments, the front end 115 may perform one or more of the following actions: filtering, amplifying, analog-to-digital conversion, etc. on the received RF signal.

In certain embodiments, the memory 113 can store computer readable instructions for causing the processor 111 to detect the presence of a drone (e.g., the drones 103A-103N of FIG. 1) based on the RF signals received via the receive antennae 119A-119N. In addition, in certain embodiments, the drone detection system 101 can also be configured to provide a signal (e.g., a jamming signal or an RF communication signal) to the front end 115 to be transmitted to the detected drone(s). The front end 115 can then process the signal received from the processor 111 before providing the processed signal to one or more of the transmit antennae 117A-117N.

There are a number of different techniques that the drone detection system 101 can use to detect the presence of the drones 103A-103N. For example, the drone detection system 101 can scan the airwaves at frequencies known to be used by particular model(s) of the drones 103A-103N. If a known protocol is identified, the drone detection system 101 can then decode the signal as if it was the intended receiver/controller 105A-105N. Depending on the embodiment, these decoding steps can include: synchronization, channel estimation, deinterleaving, descrambling, demodulation, and error control decoding. In certain embodiments, the drone detection system 101 can be configured to perform some of the aforementioned steps blindly due to lack of knowledge (such as device id) on information known by the controller 105A-105N. As described below, the blind detection of the drones 103A-103N using certain communication protocols (e.g., a synchronization signal) are provided herein. Once detected, the drone detection system 101 can provide alert(s) regarding the presence of the one or more drones 103A-103N.

The drone detection system 101 can monitor the presence of the one or more drones 103A-103N. As part of monitoring, a position of the one or more drones 103A-103N relative to the environment 100 can be monitored in real-time to determine if the position of the one or more drones 103A-103N strays inside or outside acceptable airspace.

There are also a number of mitigation actions which can be taken by the drone detection system 101. For example, after detecting the one or more drones 103A-103N, the drone detection system 101 may take one or more of the actions described with reference to FIG. 6. For example, in certain embodiments, these actions can include do nothing/keep monitoring, drone-specific jamming, wideband jamming, and control takeover.

FIG. 2B illustrates an example drone 103 which can be detected with the drone detection system 101 in accordance with aspects of this disclosure. In certain embodiments, the drone 103 includes one or more propellers 121, one or more motor controllers 123, a battery or other power source 125, a memory 127, a processor 129, a front end 131, an antenna 133, and a camera 135. As described above, the antenna 133 may be configured to receive RF signals 107 from the controller 105 (see FIG. 2C) and provide RF signals 107 back to the controller 105 (e.g., images obtained from the camera 135). In certain embodiments, the RF signals 107 sent/received from the antenna 133 are provided to/from the processor 129 and processed by the front end 131. In certain embodiments, the propeller(s) 121 provide lift and control movement of the drone 103 as it maneuvers through airspace. The propeller(s) 121 may also include one or more motor(s) (not illustrate) configured to individually power each of the propeller(s) 121.

In certain embodiments, the motor controller(s) 123 are configured to receive instructions from the processor 129 (e.g., based on instructions stored in the memory 127 and the RF signal 107 received from the controller 105) to move the drone 103 to a specific point in the airspace and translate the received instructions into motor position commands which are provided to the propeller(s) 121. In certain embodiments, the battery 125 provides power to each of the components of the drone 103 and has sufficient power storage to enable the propellers 121 to maneuver the drone 103 for a predetermined length of time. The camera 135 can capture images in real-time and provide the captured images to the controller 105 via the antenna 133 which can aid a user in controlling movement of the drone 103.

FIG. 2C illustrates an example controller 105 which can be used to control the drone 103 in accordance with aspects of this disclosure. In certain embodiments, the controller 105 comprises a memory 141, a processor 143, a front end 145, an antenna 147, an input device 149, and a display 151. As described above, the antenna 147 may be configured to receive RF signals 107 (e.g., images obtained from the camera 135) from the drone 103 (see FIG. 2B) and provide RF signals 107 back to the drone 103 to control movement of the drone 103. In certain embodiments, the RF signals 107 sent/received from the antenna 147 are provided to/from the processor 143 and processed by the front end 145. In certain embodiments, the input device 149 is configured to receive input from a user which can be used by the processor 143 to generate commands for controlling movement of the drone 103. In certain embodiments, the display 151 is configured to display images received from the drone 103 to the user to provide feedback on the current position of the drone 103 and its environment 100. In some embodiments, the display can be implemented as a pair of goggles worn by the user to provide a first person view of images obtained by the camera 135.

Figure 2D:
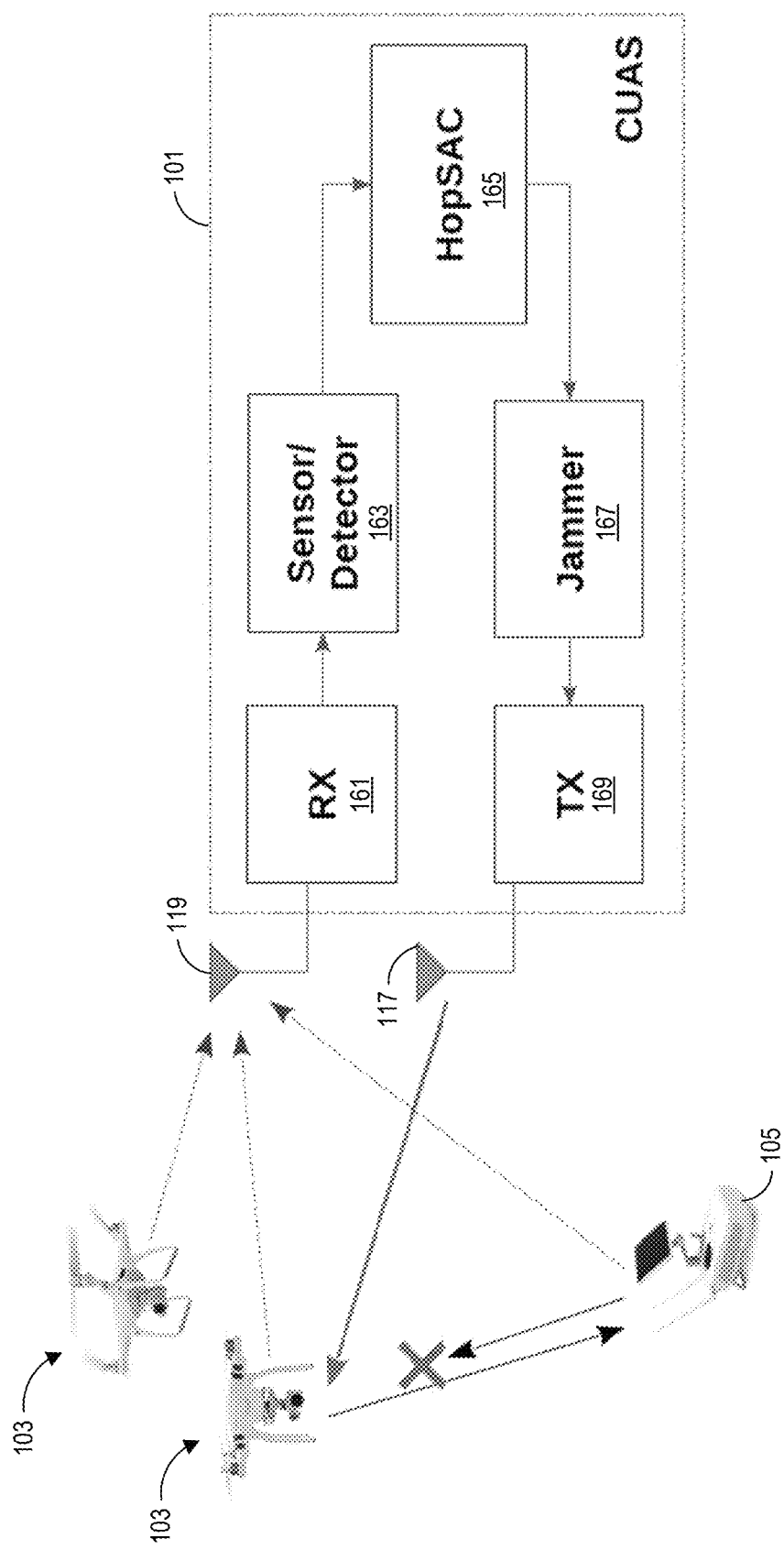
FIG. 2D illustrates another example drone detection system which can be used to detect the presence of one or more drones in accordance with aspects of this disclosure.

FIG. 2D illustrates another example drone detection system 101 which can be used to detect the presence of the one or more drones 103 in accordance with aspects of this disclosure. In particular, the drone detection system 101 illustrated in FIG. 2D is a simplified system model. Depending on the implementation, the drone detection system 101 can include a greater or fewer number of components than shown in FIG. 2D. The drone detection system 101 includes a receive antenna 119, a receiver 161, a sensor/detector 163, a HopSAC estimator 165, a jammer 167, a transmitter 169, and a transmit antenna 117. Although illustrated in separate blocks in FIG. 2D, one or more of the blocks 161-169 may be implemented together by the same component(s). For example, in one implementation the receiver 161, the sensor/detector 163, the jammer 167, and the transmitter 169 can be implemented by the front end 115 illustrated in FIG. 2A, while the HopSAC estimator 165 can be implemented by the processor 111 illustrated in FIG. 2A.

In certain embodiments, the drone detection system 101 can receive wideband frequency-hopping signals from all of the drones 103 and/or controllers 105 within a detection range of the drone detection system 101. In certain embodiments, the drone detection system 101 can then store signal parameters for each of the received frequency-hopping signal in the form of pulse descriptor words (PDW) after preprocessing. In some implementations, preprocessing may involve generating clusters of the frequency-hopping signals based on one or more of the following: emitter type or angle of arrival, level control with power squelch, and/or correlation by matched filtering.

In certain embodiments, the sensor/detector 163 can determine the presence of a given one of the frequency-hopping signals at time $\tilde{t}_n$ and frequency $\tilde{f}_n$, where n is the index of the time-frequency samples. In certain embodiments, the sensor/detector 163 can send a set of time-frequency samples $\{(\tilde{t}_n, \tilde{f}_n)\}$ every $T_s$ seconds to the HopSAC estimator 165 for parameter estimation. In certain embodiments, the HopSAC estimator 165 can estimate the frequency-hopping parameters and provide the estimated parameters to configure the jammer 167. In certain embodiments, the transmitter 169 can transmit interference signals for counterattack via the transmit antenna 117.

Detection of Drone(s) Using Frequency Hopping

In recent years, the use of drones 103 has gained popularity due to their affordability and versatility. Drones 103 have been widely used in many applications from recreational flying such as drone racing to commercial uses such as package delivery and real estate photography. According to FAA Forecast, the use of non-model (commercial) drones 103 will grow three-fold from 2018 to 2023 whereas the use of model (recreational) drones 103 will increase from 1.25 to 1.39 million units in 5 years. However, unauthorized drone activities and incidents have been reported more and more frequently near airports, stadiums, and borders, which has caused growing concerns about public safety and homeland security. Therefore, an effective drone detection system 101 becomes an indispensable mechanism for law enforcement and military to detect, identify, and disable any potential and imminent threats caused by the improper and unauthorized uses of drones 103.

In certain embodiments, the drone detection system 101 is capable of detecting any wireless signal transmitted from the drones 103 and the controllers 105 when they are in the detection range, and determining when in time and where in frequency the received signals are detected. Nevertheless, the time and frequency information are subject to errors, which can be caused by sensing and measurement errors, channel impairments such as fading and interference, and/or hardware limitations such as carrier frequency offsets and timing jitters. One of the main challenges in detecting the drones 103 is to identify the frequency hopping parameters from these noisy time-frequency samples. The estimation of these parameters is further complicated by multi-target scenarios where multiple drones 103 are present within the detection range.

There are many frequency hopping parameter estimation methods based on a variety of techniques: dynamic programming and low-rank trilinear decomposition, sparse linear regression, sparse Bayesian method, and orthogonal matching pursuit. The implementation complexity of these methods is generally too high to be performed in real-time. Thus, they are not suitable for real-time applications that have critical response time constraints.

Aspects of this disclosure relates to systems and methods for detection one or more drones 103 using a frequency hopping parameter estimation method (which may be referred to as "HopSAC") based on the random sample consensus algorithm. Random sample consensus (RANSAC) is a technique for estimating parameters of a model by fitting the model to observation data. Similar to RANSAC, certain methods described herein outperform the linear Least Squares (LS) method for its excellent capability of rejecting gross errors with only a small subset of samples. Gross errors, also known as outliers, are data samples significantly deviating from the majority of observations. The ability of the methods described herein to discard gross errors allows the drone detection system 101 to tolerate a higher false alarm rate for detection at a lower signal-to-noise ratio (SNR). In addition, certain methods described herein are very robust to timing and frequency errors, enabling the jammer 167 to transmit much more precise pulses in time, and thus improving power efficiency and reducing collateral damage.

Aspects of the HopSAC techniques described herein provide effective ways for drone detection systems 101 to achieve high performance of estimation accuracy with low complexity in the real-time parameter estimation of frequency hopping drones and controllers.

Model of Frequency Hopping Communications

In order to describe the systems and techniques used for detection of frequency hopping parameters, the drone detection system 101 uses one or more models of the linear hopping sequences used by the drones 103 for communication. That is, the drone 103 communicate with the controller 105 using RF communications that hop between different frequencies (or channels) during communication. As previously discussed, there may be more than one drone 103 present within the detection range of the drone detection system 101.

Figure 2E:
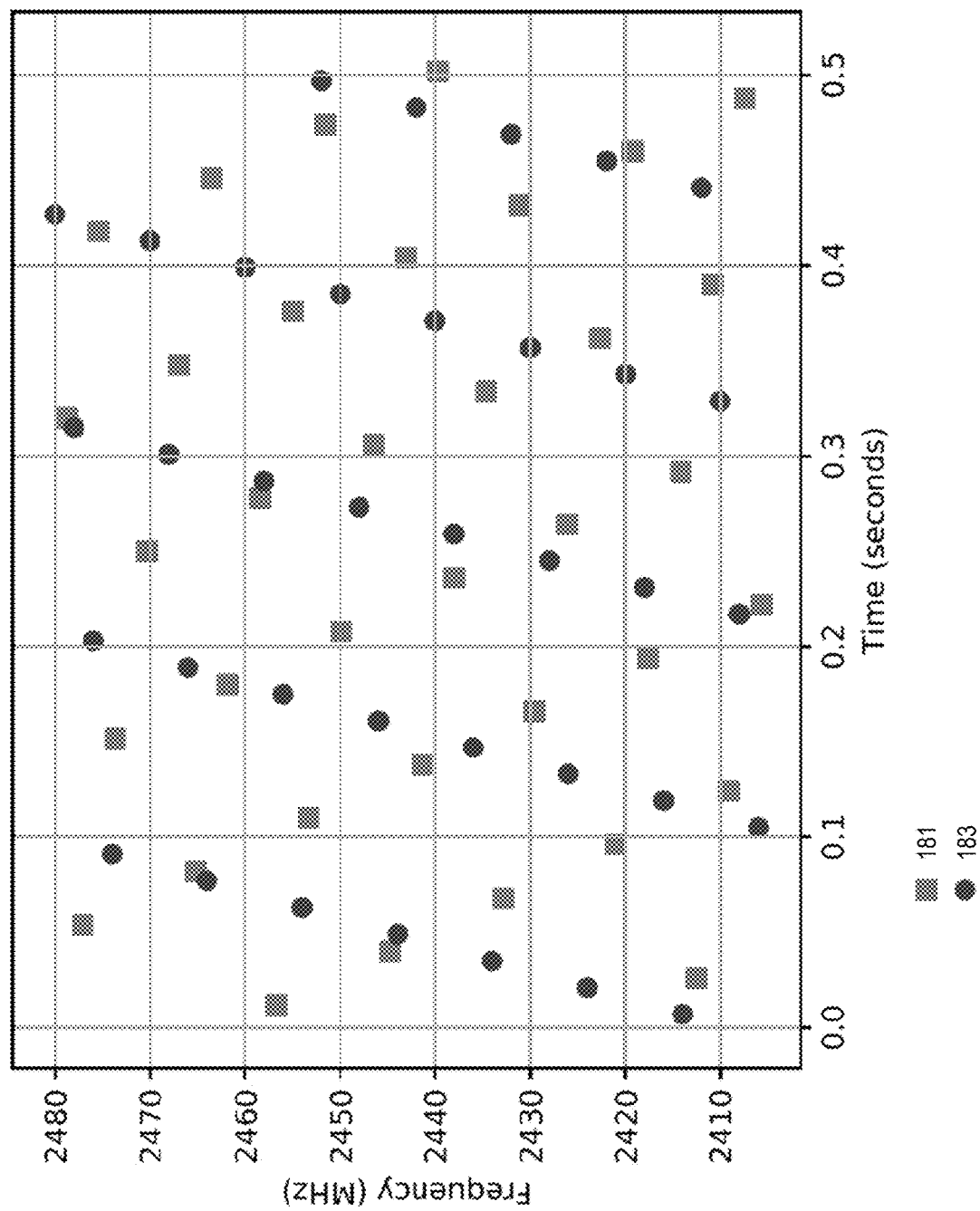
FIG. 2E illustrates an example of frequency hopping sequences used by two different drones in accordance with aspects of this disclosure.

FIG. 2E illustrates an example of frequency hopping sequences used by two different drones 103 in accordance with aspects of this disclosure. In FIG. 2E, the red points illustrate a first frequency hopping sequence 181 and the blue points illustrate a second frequency hopping sequence 183. As shown in FIG. 2E, the first and second frequency hopping sequences 181 and 183 each hop between a plurality of frequencies at regular time periods.

In certain embodiments, the frequency hopping sequences may be linear frequency hopping sequences, such as the first and second frequency hopping sequences 181 and 183 illustrated in FIG. 2E. Techniques for detecting the drones 103 using linear frequency hopping sequences are provided in detail herein, however, aspects of this disclosure can also be applied to other types of frequency hopping sequences, such as: pseudo random frequency hopping sequences (e.g., linear feedback shift register (LFSR)-based pseudo random hopping sequences), non-linear frequency hopping sequences, arbitrary linear frequency hopping sequences, etc.

A model of the linear frequency hopping sequences illustrated in FIG. 2E can be described using $x=\{x_n\}$ representing a sequence of 2-tuples and $x_n=(\tilde{t}_n, \tilde{f}_n)$ representing the time-frequency observations of frequency-hopping signals. Defining $t_n$ and $f_n$ as the time and the frequency, respectively, of drone 103 transmissions, the timing errors can be defined as $t_{\delta,n}=\tilde{t}_n-t_n$ and frequency errors $f_{\delta,n}=\tilde{f}_n-f_n$. The timing and frequency errors $t_{\delta,n}$ and $f_{\delta,n}$ can be assumed to be independent and identically distributed (i.i.d.) zero mean Gaussian variables with variance $\sigma_t^2$ and $\sigma_f^2$, respectively. That is, $t_{\delta,n} \sim N(0,\sigma_t^2)$ and $f_{\delta,n} \sim N(0,\sigma_f^2)$. In addition to measurement errors, the occurrence of gross errors can be assumed to follow a Poisson distribution with parameter $\lambda$, where $\lambda$ is the average number of gross errors per time interval $T_s$ which can be referred to as an outlier arrival rate. Therefore, each sample $x_n$ could be the transmission of a real target drone or a false alarm caused by a spurious source or hardware impairments. It can be important to distinguish between the transmission of the real target drone 103 from a false alarm in order to effectively detect the presence of the drones 103 using frequency hopping.

As describe above, the techniques described herein can be applied to arbitrary frequency hopping models. However, certain linear hopping sequences such as linear feedback shift register (LFSR)-based pseudo random hopping sequences require a large number of samples for accurate fit due to a large number of hopping states. As an example, a linear hopping sequence $f_m$ can be modeled as:

$$f_m = (f_0 - f_b + m \cdot f_d \bmod B) + f_b, \; m = 0, 1, \ldots \quad (1)$$

where $f_0$ is the start frequency of the first hop after timestamp 0, $f_b$ is the center frequency of the lowest channel, $f_d$ is frequency difference or frequency spacing between two neighboring hops, $B = N_c \cdot b$ is the total bandwidth of all channels, $N_c$ is the number of channels used in the hopping sequence, and b is the channel bandwidth, which may be known to the drone detection system 101 in certain embodiments. In some circumstances, not all hops may be observed and detected by the drone detection system 101. If the channel center frequencies are mapped to channel numbers starting from channel 0, (1), the linear frequency hopping sequence $f_m$ can be simplified to:

$$c_m = c_0 + m \cdot c_d \bmod N_c, \; m = 0, 1, \ldots \quad (2)$$

where $c_m = (f_m - f_b)/b$, $c_0 = (f_0 - f_b)/b$, and $c_d = f_d/b$. $c_d$ can also be referred to as hop number or hop count. The corresponding timestamp $t_m$ of each hop can be given by:

$$t_m = t_0 + m \cdot t_d, \; m = 0, 1, \ldots \quad (3)$$

where $t_0$ is the start time of the first hop and $t_d$ is the time interval between two neighboring hops known as hop period. Hence, in some embodiments, the frequency hopping parameter model contains five parameters: i) time start $t_0$, ii) frequency start $f_0$ or channel start $c_0$, iii) hop period $t_d$, iv) frequency spacing $f_d$ or hop count $c_d$, and v) number of channels $N_c$. In the example of a of LFSR-based pseudo random sequence, the parameters can include the sequence length N (e.g., the number of LFSR stages L) and the polynomials $(g_0, \ldots, g_{L-1})$, given the mapping from binary sequences to center frequencies of channels.

The operating frequencies of small model drones may be publicly known and published in FCC test reports. For example, 39 channels may be defined from 2404 MHz to 2480 MHz in 2.4 GHz band for DJI GL300A remote controller. The differences of operating frequencies can be derived from all possible center frequency of channels. FIG. 2E shows an example of frequency hopping sequences from DJI remote controllers GL300A and GL300F. The first frequency hopping sequence 181 can be defined by the parameters: $f_b$=2404 MHz, $t_0$=0.012 s, $f_0$=2456.7 MHz, $t_d$=0.014 s, $f_d$=32.3 MHz, $N_c$=45, and b=1.7 MHz, and the second frequency hopping sequence 183 can be defined by the parameters: $f_b$=2404 MHz, $t_0$=0.007 s, $f_0$=2414 MHz, $t_d$=0.014 s, $f_d$=10 MHz, $N_c$=39, and b=2 MHz.

Overview of Techniques for Detecting Frequency Hopping Parameters

Figure 3:
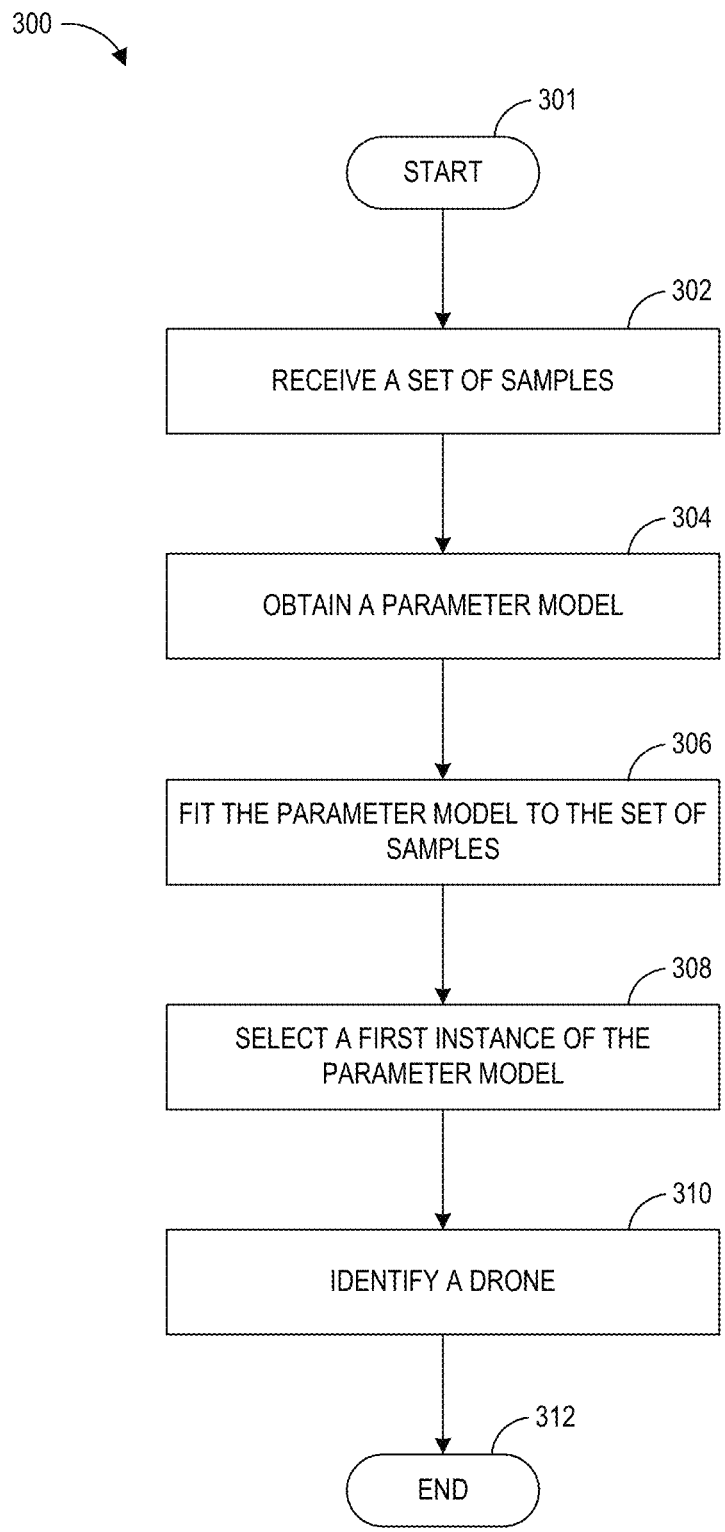
FIG. 3 illustrates a method for detecting the presence of the drone in accordance with aspects of this disclosure.

FIG. 3 illustrates a method 300 for detecting the presence of the drone 103A-103N in accordance with aspects of this disclosure. Specifically, the method 300 involve detecting frequency hopping parameters for the one or more drones 103 within a detection range. In particular, the drone detection system 101 can detect the parameters that define the frequency hopping sequence used for communication between the one or more drones 103A-103N and the controllers 105A-105N in order to detect the presence of the one or more drones 103A-103N.

The method 300 begins at block 301. At block 302, the method 300 involves receiving a set of samples from the RF receiver for a time interval. In some implementations, the method 300 can involve receiving a vector of time-frequency samples x of length $\|x\| = N_s$ from the sensor/detector 163 for each time interval $T_s$.

At block 304, the method 300 involves obtaining a parameter model of the frequency hopping parameters. For example, when detecting the one or more drones 103 using a linear frequency hopping sequence, the parameter model may correspond to one of the models defined by equations (1) and (2). However, aspects of this disclosure are not limited to the parameter models described in equations (1) and (2), and other parameter models can be used in other embodiments.

At block 306, the method 300 involves fitting the parameter model to the samples. Aspects of this disclosure relate to using the RANSAC paradigm in fitting the parameter model to the samples. In some implementations, the fitting of the parameter model to the samples involves randomly selecting $n_s$ samples from the set of samples x, using the selected samples $n_s$ to estimate the parameters, constructing an instance of the parameter model using the estimated parameters, and classifying the samples $n_s$ as inliers or outliers by evaluating fitting errors for each of the samples $n_s$. Here inliers refer to the samples closely matching the parameter model with negligible or no fitting errors (e.g., with a fitting error less than a threshold error value) whereas outliers are samples resulting in large errors (gross errors) from the fitting (e.g., with a fitting error equal to or greater than the threshold error value).

The block 306 process of fitting the parameter model to the samples may be repeated for $N_r$ trials to construct a plurality of instances of the parameter model. At block 308, the method 300 involves selecting one of the first instances of the parameter model based on the inliers and outliers for each of the constructed first instances of the parameter model. In certain embodiments, for example, the "best" model, M, can be selected as the instance of the parameter model having the largest number of inliers |I| as the largest group of samples, I, reaches the consensus.

At block 310, the method 300 can involve identifying a first target drone 103 based on the selected instance of the parameter model. After selecting the instance of the parameter model for the first target drone 103, the instance of the parameter model can be stored in a target set T. The method 300 can further involve subtracting the set of inliers from the set of samples because these inliers already formed the consensus group associated with the first target drone 103. As a result, the set of outliers, O, can be used as input samples x to find a best model of a second target drone 103. Thus, the method 300 can be repeated starting from block 302 with the received set of samples being the subset of samples with the inliers from the first target drone 103 being removed. The method 300 can be repeated until no new target drone 103 is found or the number of outliers remaining in the set of samples is insufficient for performing the method 300. Once the method 300 is completed, the target set T contains the instances of the parameter model for all of the detected target drones 103.

Estimation of Model Parameters

Figure 4:
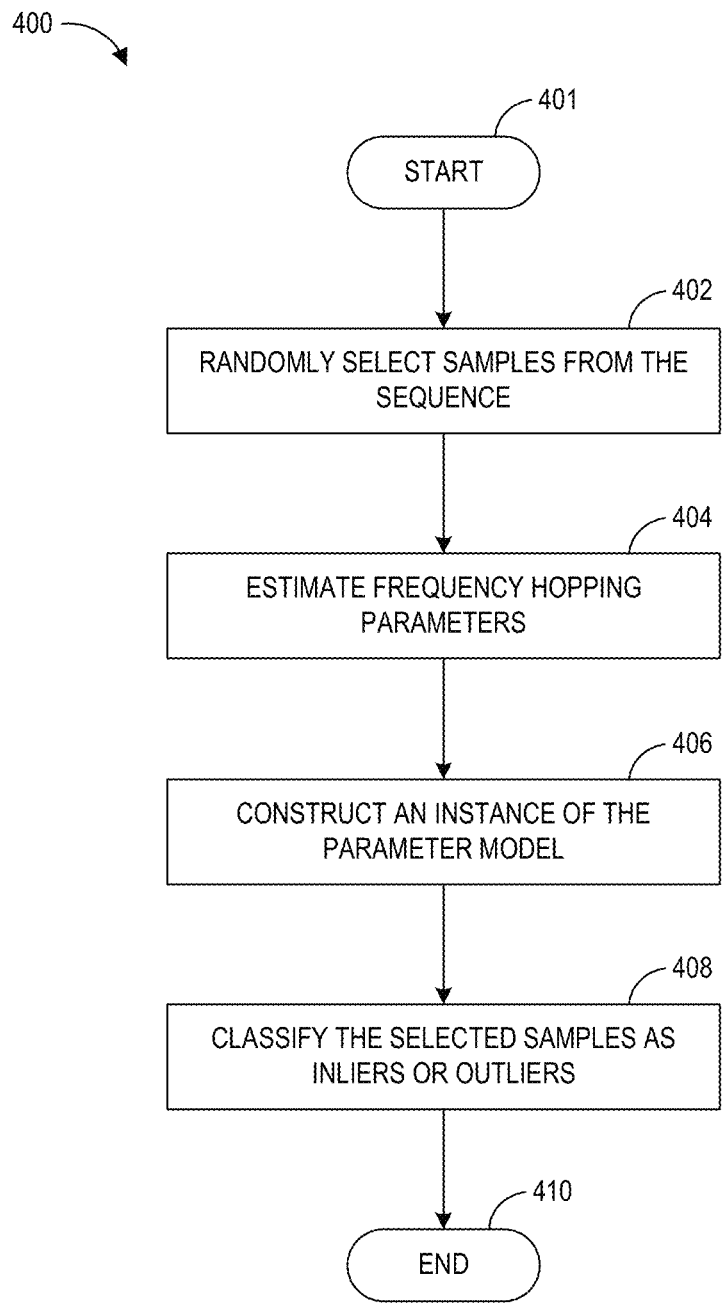
FIG. 4 illustrates a method for estimating the parameters of the parameter model in accordance with aspects of this disclosure.

FIG. 4 illustrates a method 400 for estimating the parameters of the parameter model in accordance with aspects of this disclosure. For example, the method 400 can be performed as a part of block 306 of method 300 for fitting the parameter model to the selected samples.

In certain embodiments, the model parameter estimation procedure estimates the model parameters using the randomly selected samples and the knowledge of define channel center frequencies $F_i$. The drone detection device can store a set $F = \cup_i F_i$ of publicly known and defined channel center frequencies $F_i$ for frequency hopping device type i. The frequency differences of any two defined channel frequencies and the total number of channels for a given device type i may also be known based on the prior knowledge of $F_i$.

With reference to FIGS. 3 and 4, in each trial r of the method 300, the method 400 can be used to estimate the model parameters of each device type i using the prior knowledge of the channel center frequencies $F_i$, and obtain a parameter model M' of this device type. In certain embodiments, by using the model parameters in the device type parameter model M', the drone detection system 101 can calculate the fitting errors of all samples from the set of samples and classify each sample as an inlier or an outlier depending on the fitting errors between the particular sample and the device type parameter model M'.

The device type parameter model M' can be compared to the instance of the parameter model M selected in block 308 if the selected instance of the parameter model M was found in previous trials r. In certain embodiments, the selected instance of the parameter model M can be replaced with device type parameter model M' if the number of inliers, |I'|, of the device type parameter model M' is greater than the number of inliers of the selected instance of the parameter model M. That is, the device type parameter model M' may be more likely to be the best estimate of the target drone 103 when a larger number of inliers reaching the consensus are associated with the device type parameter model M' than the selected instance of the parameter model M. At the end of all trials r, the best model remaining in selected instance of the parameter model M will be the model of the detected target drone 103 with a specific set of estimated hopping parameters.

In certain embodiments, the model parameter estimation procedure estimates model parameters using randomly selected samples and the knowledge of the defined channel center frequencies $F_i$. With reference to FIG. 4, at block 402 the method 400 involves randomly selecting $n_s$ samples from the observations in time interval $T_s$. For a linear hopping model such as the model defined in equations (1) and (2), as few as two samples ($n_s$=2) randomly selected each time may be sufficient for parameter estimation. In certain embodiments, $n_s$ samples are first randomly selected: $(\tilde{t}_j, \tilde{f}_j)$, j=1, 2, . . . , $n_s$. The sets of time differences and frequency differences between any of two samples can be calculated as: $D_t = \{D_{t,j,k} | |\tilde{t}_j - \tilde{t}_k|, j<k\}$ and $D_f = \{D_{f,j,k} | |\tilde{f}_j - \tilde{f}_k|, \tilde{t}_j < \tilde{t}_k, j<k\}$, respectively. There are $$n_c = \binom{n_s}{2}$$

elements in $D_t$ and in $D_f$.

At block 404, the method 400 involves estimating the frequency hopping parameters. For example, in one example, block 404 can involve first finding new estimates of the hop period $t_d$ and the start time of the first hop $t_0$. The sensor/detector 163 can provide a coarse estimate $\bar{t}_d$ of the hop period $t_d$. For each $d_{t,j,k} \in D_t$, the number of hop intervals between samples $(\tilde{t}_j, \tilde{f}_j)$ and $(\tilde{t}_k, \tilde{f}_k)$ can be found by:

$$n_{h,j,k} = \lfloor d_{t,j,k}/\bar{t}_d \rfloor \tag{4}$$

where $\lfloor \cdot \rfloor$ denotes a rounding function. The hop period $t_d$ estimate for each $d_{t,j,k}$ can be obtained as:

$$\hat{t}_{d,j,k} = d_{t,j,k}/n_{h,j,k}. \tag{5}$$

The start time of the first hop $t_0$ can then be estimated as:

$$\hat{t}_{0,j,k} = ((s_f \tilde{t}_j) \bmod (s_f \hat{t}_{d,j,k}))/s_f \tag{6}$$

where $s_f$ is the stability factor for numerical stability.

The drone detection system 101 can next find the new estimates of the frequency start $f_0$ and the frequency spacing $f_d$. From the channel center frequencies $F_i$, the set of differences of operating frequencies in the channel center frequencies $F_i$ is $D_i = \{|f_j - f_k|, j \neq k, f_j, f_k, \in F_i\}$. For each $d_{f,j,k} \in D_f$, if $d_{f,j,k}$ matches any elements in $D_i$ within a small error $\delta_f$, the estimate of frequency difference between hops, $\hat{f}_{d,j,k}$, is the $f_{d,j,k}$ that satisfies:

$$f_k = ((f_j - f_b + n_{h,j,k} \hat{f}_{d,j,k}) \bmod B) + f_b. \tag{7}$$

To find the start frequency $f_{0,j,k}$, the method 400 can involve first finding the number of hops from $(\tilde{t}_j, \tilde{f}_j)$ to the first sample, $n_{0,j,k}$, given by:

$$n_{0,j,k} = \lfloor (\tilde{t}_j - \hat{t}_{0,j,k})/\hat{t}_{d,j,k} \rfloor \tag{8}$$

The start frequency $f_{0,j,k}$ can be estimated as:

$$\hat{f}_{0,j,k} = ((f_j - f_b - n_{0,j,k} \hat{f}_{d,j,k}) \bmod B) + f_b. \tag{9}$$

If the estimates in the same group are the same or only differ in a negligible value, they can be determined to be valid estimates and an instance of the parameter model can be created using the valid estimates. That is:

$$\hat{t}_0 = \Sigma_{j,k} \hat{t}_{0,j,k}/n_c \text{ if } |\hat{t}_{0,j,k} - \hat{t}_{0,m,n}| < \delta_t \tag{10}$$

$$\hat{t}_d = \Sigma_{j,k} \hat{t}_{d,j,k}/n_c \text{ if } |\hat{t}_{d,j,k} - \hat{t}_{d,m,n}| < \delta_t \tag{11}$$

$$\hat{f}_0 = \Sigma_{j,k} \hat{f}_{0,j,k}/n_c \text{ if } |\hat{f}_{0,j,k} - \hat{f}_{0,m,n}| < \delta_f \tag{12}$$

$$\hat{f}_d = \Sigma_{j,k} \hat{f}_{d,j,k}/n_c \text{ if } |\hat{f}_{d,j,k} - \hat{f}_{d,m,n}| < \delta_f \tag{13}$$

$j \neq m$, $k \neq n \forall j$, k, n, m. In addition, $\hat{t}_0 = \tilde{t}_{0,j,k}$, $\hat{t}_d = \tilde{t}_{d,j,k}$, $\hat{f}_0 = \tilde{f}_{0,j,k}$, $\hat{f}_d = \tilde{f}_{d,j,k}$ if $n_c = 1$ ($n_s = 2$). The number of channels $\hat{N}_c$ may be simply $|F_i|$. In block 406, the method 400 can construct an instance of the parameter model as M'=$\{\hat{t}_d, \hat{t}_0, \hat{f}_d, \hat{f}_0, \hat{N}_c\}$. As described above, at block 408, the method 400 can involve classifying the samples $n_s$ as inliers or outliers by evaluating fitting errors for each of the samples $n_s$. For example, the drone detection system 101 can compare the fitting error of each of the samples $n_s$ to the threshold error value and classify the samples $n_s$ that have a fitting error that is less than the threshold error value as inliers and the remaining samples $n_s$ as outliers. The method 400 ends at block 410.

Classification of Inliers and Outliers

An embodiment of the classification process of block 408 can begin with a fitting error evaluation, which involves calculates the fitting errors of all samples based on the current instance of the parameter model in M'. In some implementations, for each sample k, the drone detection system 101 can find a time fitting error $\epsilon_{t,k}$ and a frequency fitting error $\epsilon_{f,k}$ separately. The time fitting error $\epsilon_{t,k}$ can be calculated with the assistance of $s_f$ for numerical stability as:

$$\epsilon_{t,k} = (\lfloor \tilde{t}_k \cdot s_f \rfloor \bmod \lfloor \hat{t}_d \cdot s_f \rfloor)/(s_f \cdot \hat{t}_0). \tag{14}$$

To find frequency fitting error $\epsilon_{f,k}$, the drone detection system 101 can first determine hop phase $h_p$, which is the number of hop intervals from the beginning of the set of samples to the current sample $(\tilde{t}_k, \tilde{f}_k)$ given by:

$$h_{p,k} = \lfloor \tilde{t}_k - \hat{t}_0 \rfloor / \hat{t}_d \tag{15}$$

The drone detection system 101 can then estimate the frequency of the current sample based on model parameters as:

$$\hat{f}_k = ((\hat{f}_0 - f_b + h_{p,k} \hat{f}_d) \bmod B) + f_b \tag{16}$$

The frequency fitting error can then be determined as $\epsilon_{f,k} = \hat{f}_k - \tilde{f}_k$. The drone detection system 101 can then determine the combined fitting error $\epsilon$ by the square root of the sum of time error $\epsilon_{t,k}$ squared and frequency error $\epsilon_{f,k}$ squared. That is, $\epsilon_k=\sqrt{\epsilon_{t,k}^2+\epsilon_{f,k}^2}$. The fitting error of each sample, $\epsilon_k$, can be compared to a fitting error threshold $\bar{\gamma}$. If $\epsilon_k$ is smaller than $\bar{\gamma}$, sample $x_k$ is an inlier and is included in the set of inliers, I', otherwise, it is an outlier, which is included in the set of outliers, O'.

Example Method for Monitoring the Drone(s)

Figure 5:
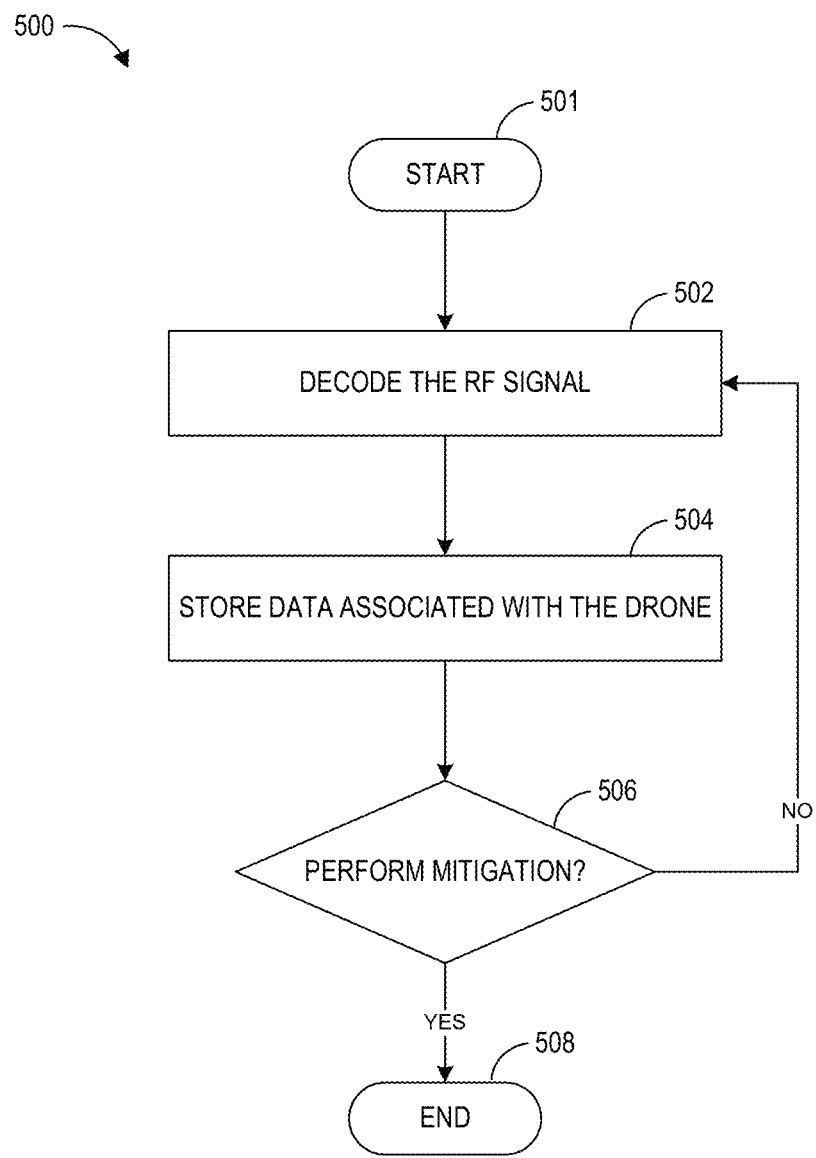
FIG. 5 is an example method which can be performed by the drone detection system to monitor the one or more drones.

Once a drone 103 has been detected, for example, using one of the above metrics, the drone detection system 101 can monitor the drone 103 for a period of time before potentially taking mitigation actions against the drone 103. FIG. 5 is an example method 500 which can be performed by the drone detection system 101 to monitor one or more of the drones 103.

The method 500 begins at block 501. In certain implementations, the method 500 may be performed in response to detecting the drone 103 based on the method 300 of FIG. 3. At block 502, the method 500 involves decoding the RF signal 107 transmitted between the drone 103 and the controller 105. In the case where the frequency hopping parameters of the RF signal 107 are estimated in accordance with aspects of this disclosure, the decoding of the RF signal 107 may be performed by configuring the receiver 161 to follow the reconstructed frequency hopping sequence using these parameters and synchronize with the RF signal 107.

At block 504, the method 500 involves storing data associated with the drone 103 from the decoded RF signal 107. For example, the data can include any activities performed by the drone 103 (e.g., flight data), drone behaviors that may indicate whether the drone 103 is a friend or foe, a unique drone identifier, etc. At block 506, the method 500 involves determining whether to perform mitigation actions on the drone 103. In response to determining that mitigation actions are warranted, the method 500 may end at block 506, where a mitigation method 600 can be performed. In response to determining that mitigation actions are not warranted, the method 500 returns to block 502.

Example Method for Mitigating the Drone(s)

Figure 6:
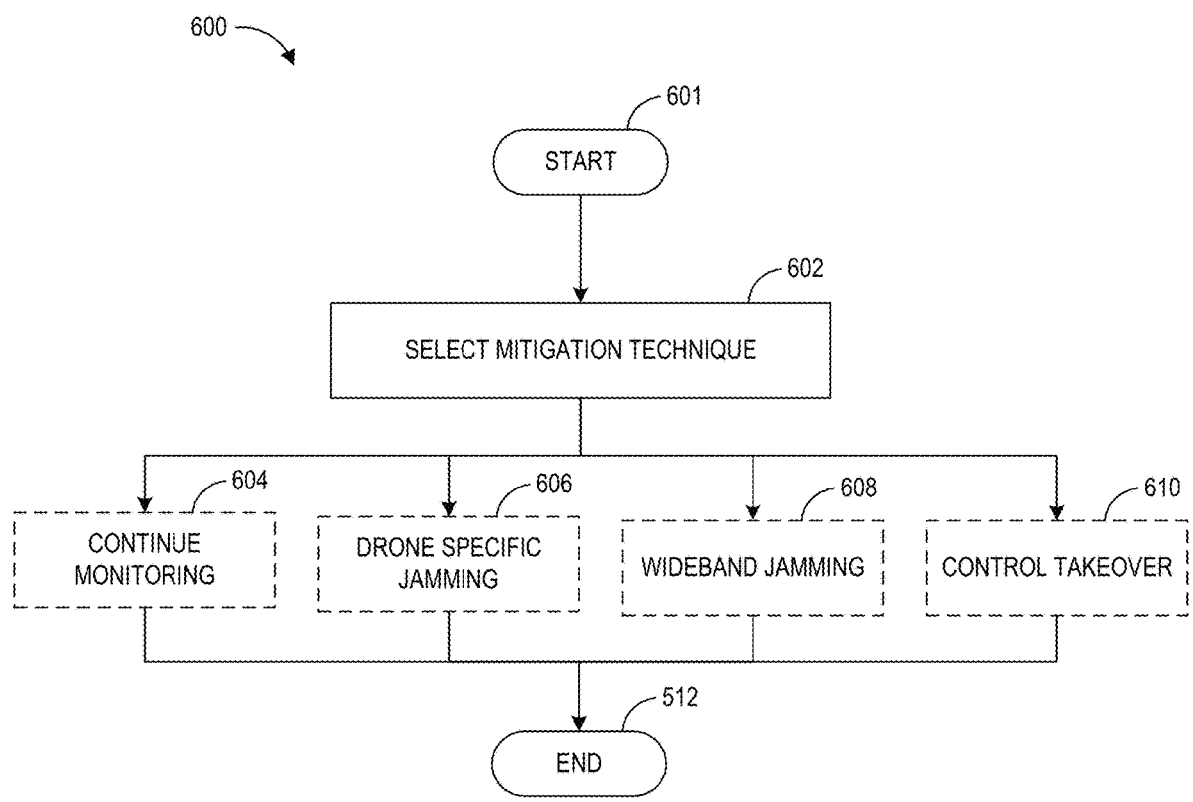
FIG. 6 is an example method which can be performed by the drone detection system to mitigate the one or more drones.

After determining that mitigation of the drone 103 is appropriate and in certain embodiments, the drone detection system 101 performs one or more of a number of different mitigation actions in accordance with aspects of this disclosure. FIG. 6 is an example method 600 which can be performed by the drone detection system 101 to mitigate one or more of the drones 103.

The method 600 begins at block 601. In certain implementations, the method 600 may be performed in response to determining that mitigation actions are warranted in block 506 of FIG. 5. At block 602, the method 600 involves selecting a mitigation technique to perform. The method 600 then involves continuing to one of blocks 604-610 based on the mitigation technique selected in block 602.

At block 604, the method 600 involves continuing to monitor the drone 103, which may involve returning to block 502 of method 500. For example, if the drone 103 is determined to be friendly and/or if the drone detection system 101 does not have the legal authority to take more aggressive actions, the drone detection system 101 may only be authorized to continue monitoring the drone 103 while alerting a user to the presence of the drone 103.

At block 606, the method 600 involves performing drone specific jamming. For example, in the case that the drone detection system 101 has estimated the frequency hopping parameters used by the drone 103, the drone detection system 101 can configured the jammer 167 with the estimated parameters. The jammer 167 can then generate a jamming signal and transmit the jamming signal to all drones 103 within the detection range via the transmit antenna 117 to disrupt the RF communications between the drones 103 and the controllers 105.

At block 608, the method 600 involves the drone detection system 101 performing wideband jamming. In certain embodiments, wideband jamming may be appropriate where the drone detection system 101 does not have sufficient knowledge of the communication protocol used by the RF signal 107 to perform drone specific jamming and where the wideband jamming will not affect other friendly drones 103 within the environment 100.

At block 610, the method involves the drone detection system 101 taking over control of the drone 103. For example, and in certain embodiments, using the estimated frequency hopping parameters estimated in accordance with aspects of this disclosure to reconstruct the frequency hopping RF signal 107, the drone detection system 101 can send commands to the drone 103 in order to have the drone 103 perform certain maneuvers, such as landing the drone 103 in a safe area. The method 600 ends at block 612.

Simulations

The following description provides a verification of the above techniques for detecting the one or more drone 103A-103N. The verification is performed for an embodiment of the techniques described herein for hopping parameter estimation using Monte Carlo simulation with $N_{iter}=10,000$ iterations. The performance is also compared to the performance of linear LS estimation under the influence of gross errors, timing errors, and multiple targets. The parameter settings in simulations are tabulated in Table 1.

TABLE 1

| Symbol | Value | Description |
|---|---|---|
| $T_s$ | 0.5 s | Sample acquiring time interval |
| $N_s$ | 35 | Number of input samples in $T_s$ |
| $n_s$ | 2 | Number of randomly selected samples |
| $N_t$ | 1-10 | Number of targets |
| $t_d$ | 14 ± 0.1 ms | Coarse hop period |
| $\delta_t$ | 0.001 ms | Hop period threshold |
| $\delta_f$ | 100 Hz | Frequency difference threshold |
| $\bar{\gamma}$ | 0.01 | Fitting error threshold |
| $N_r$ | 100 | Number of trials |
| $N_{iter}$ | 10,000 | Number of Monte Carlo iterations |
| $s_f$ | 1000 | Stability factor |
| $F_i$ | — | Channel definition of type i |
| $N_c$ | — | Number of channels |

The following simulations are based on three linear frequency hopping devices (e.g., target drones 103). The spectrogram in 2.4 GHz band shows that the coarse time period $t_d$ between hops is roughly 14 ms. In each iteration, the simulations generate $N_t$ target drones by randomly selecting $N_t$ devices from these three devices under consideration. The frequency hopping sequence of each target drone is configured by parameters $t_0 \in [0,0.014)$, $t_d \in [0.01399, 0.0141]$, $f_0 \in F_i$, $f_d \in F_i$, $N_c=|F_i|$, where $F_i$ is determined by the selected device i. Note that the same device may be selected multiple times as multiple targets with different hopping parameters and hopping behavior. In the simulations, the hopping samples from all targets are combined, $N_o$ outliers are added where $N_o$ is determined by Poisson process with outlier arrival rate $\lambda$, and randomly placed in time interval $T_s$ and in frequency range defined in F, and $t_k$ is adjusted with timing error following Gaussian distribution $N(0, \sigma_t^2)$. Finally, all time-frequency samples are sorted in time domain to form the input samples.

The performance of the simulated embodiment and LS estimators is evaluated by using the metric: target detection probability $P_d$ defined as:

$$P_d = \frac{1}{N_{iter} \cdot N_t} \sum_{j=1}^{N_{iter}} \sum_{k=1}^{N_t} \prod_{l=1}^{5} I_{j,k,l} \quad (17)$$

where $I_{j,k,l}\{x\}$ is an indicator function of iteration j for target k and test l that returns 1 when x is true and 0 otherwise, $I_{j,k,1}=\{|t_0^k-\hat{t}_0^j|<\delta_t\}$, $I_{j,k,2}=\{|t_d^k-\hat{t}_d^j|<\delta_t\}$, $I_{j,k,3}=\{c_0^k=\hat{c}_0^j\}$, $I_{j,k,4}=\{c_d^k=\hat{c}_d^j\}$, $I_{j,k,5}=\{N_c^k=\hat{N}_c^j\}$ are the five test criteria, $t_0^k$, $t_d^k$, $c_0^k$, $c_d^k$, and $N_c^k$ are true hopping parameters of target k, and $\hat{t}_0^j$, $\hat{t}_d^j$, $\hat{c}_0^j$, $\hat{c}_d^j$, and $\hat{N}_c^j$ are best hopping parameter estimates of iteration j. Initially, the number of input samples required for satisfying target detection performance are found. Then the performance of single target detection ($N_t=1$) under the impact of gross errors and timing errors are evaluated. Finally, the parameter estimation performance in multiple target scenarios is evaluated.

Number of Input Time-Frequency Samples

Figure 7:
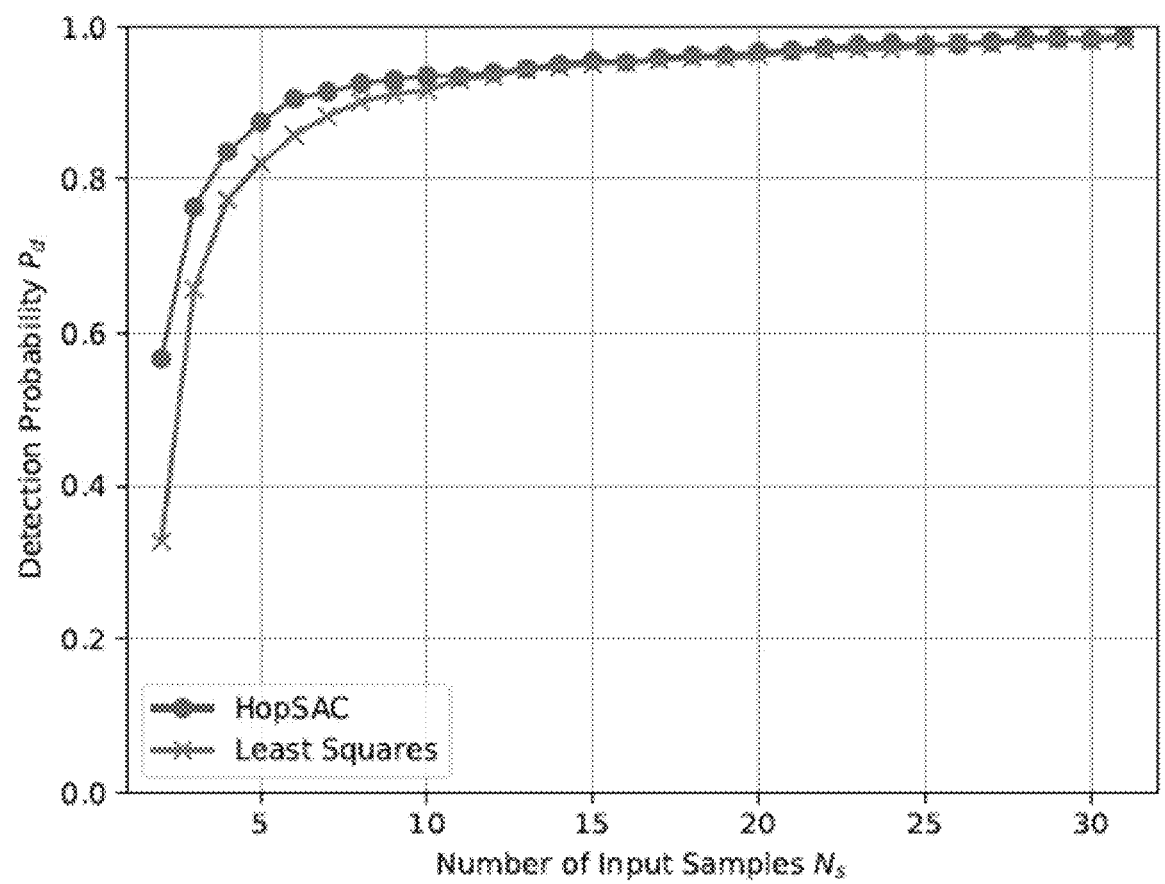
FIG. 7 is a graph showing the detection probability for different numbers of input samples for HopSAC and LS estimators with no gross errors or timing errors.

Initially, in certain embodiments, the process determines the number of samples required from the detector in each sensing/acquiring period $T_s$ to achieve a certain level of model parameter estimation accuracy and target detection probability $P_d$ found. FIG. 7 is a graph showing the detection probability $P_d$ for different numbers of input samples ($N_s$) for HopSAC and LS estimators with no gross errors ($\lambda=0$) or timing errors ($\sigma_t^2=0$). As shown in FIG. 7, the embodiment of the techniques described herein requires a slightly smaller number of samples to achieve $P_d=0.9$ than Least Squares (LS). To achieve close to 100% accuracy, both methods require approximately 35 samples. For fair comparison, the acquiring period was set to $T_s=0.5$ s for the remaining simulations unless stated otherwise, which generates about 35 time-frequency samples for coarse hop period $\hat{t}_d=0.014$ s.

Impact of Gross Errors

Figure 8:
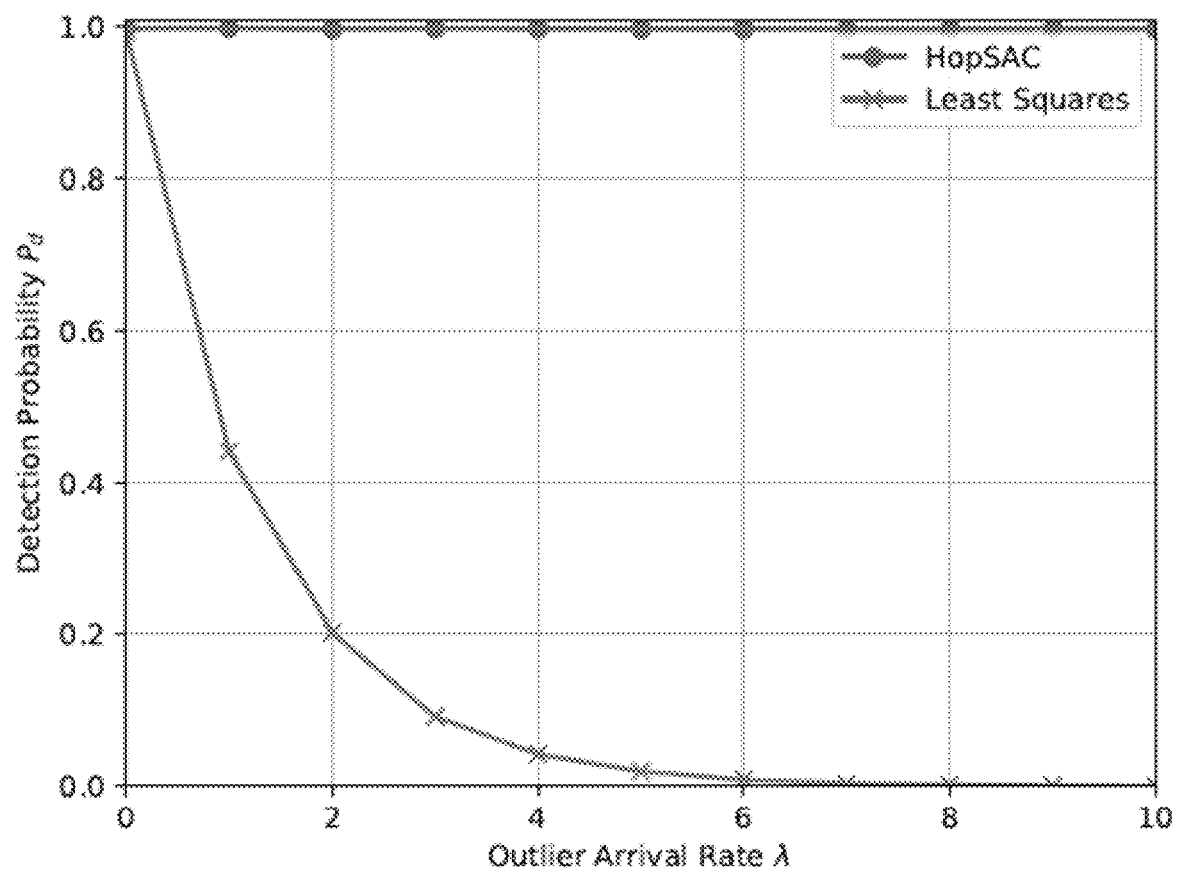
FIG. 8 is a graph showing the detection probability under the impact of gross errors.

Next, the impact of gross errors on the accuracy of model parameter estimation was evaluated. FIG. 8 is a graph showing the detection probability under the impact of gross errors. FIG. 8 shows the detection probability for the embodiment of the techniques described herein and LS estimators with different degrees of outlier arrival rates λ in the input samples. For the same acquiring period ($T_s=0.5$ s), the performance of the method according to aspects of this disclosure is virtually unaffected by increasing outlier arrival rates whereas the performance of LS degrades significantly and drops to less than 50% even with a single outlier. This result is expected because the disclosed techniques, like RANSAC, are capable of rejecting gross errors. LS, on the other hand, uses all samples including outliers for estimation. As a result, any outlier of large gross errors can considerably influence the accuracy of the fitting. In certain embodiments, since the target detection probabilities of the estimator in accordance with aspects of this disclosure are all above 0.996 for different levels of gross errors, this excellent ability to discard gross errors means that the impact of false positives is lower and a lower detection threshold can be used (e.g. a lower Constant False Alarm Rate (CFAR) threshold). Therefore, the detector is able to achieve better detection probability at a lower SNR.

Impact of Timing Errors

Figure 9:
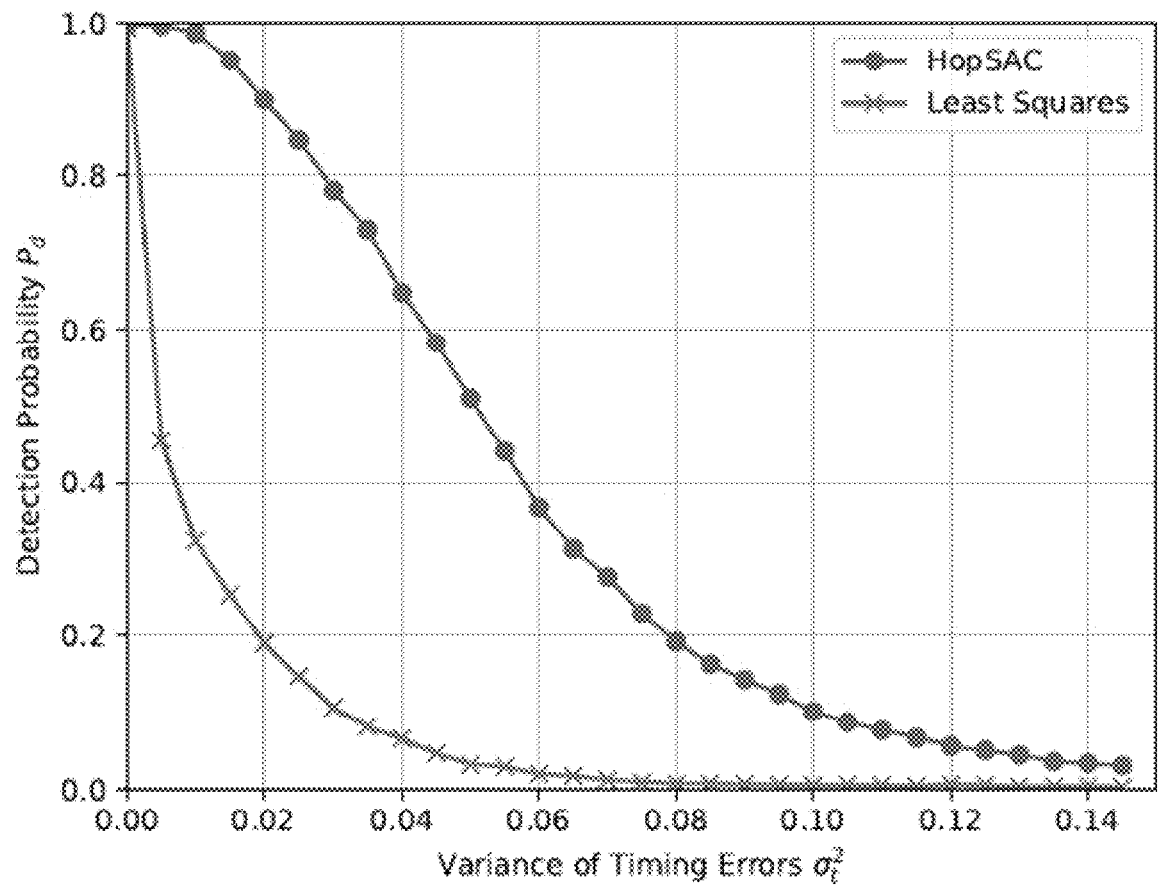
FIG. 9 shows the detection probability of the embodiment of the techniques disclosed herein and Least Squares (LS) estimators under the influence of timing errors in increasing variances of timing errors.

The effect of timing errors on the performance of hopping parameter estimation is considered next. FIG. 9 shows the detection probability of the embodiment of the techniques disclosed herein and LS estimators under the influence of timing errors in increasing variances of timing errors. As shown in FIG. 9, the techniques described herein dramatically outperform LS with the same number of samples. Unlike LS, aspects of this disclosure are very robust to small timing errors with variance $\sigma_t^2<0.01$. Since it is unlikely to observe huge timing errors with functional hardware (e.g. timing jitters are typically on the order of picoseconds), aspects of this disclosure are very robust to timing errors caused by timing jitters. The vastly improved robustness to timing errors also means that the pulses transmitted by the CUAS jammer can be much more precise in time. This improves the power efficiency of CUAS transmitters, which reduces collateral damage and unwanted interference to other legitimate UAS systems.

Multiple Target Scenarios

Figure 10:
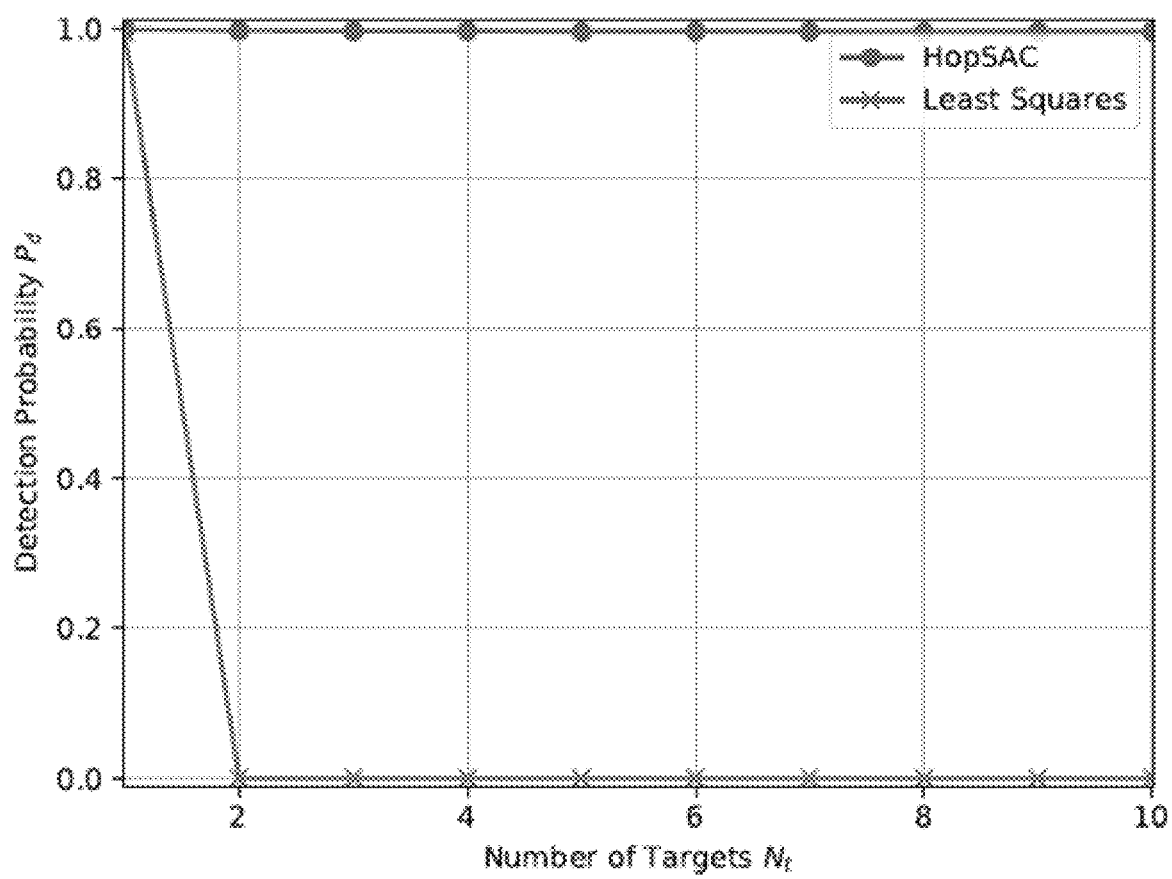
FIG. 10 shows the target detection probability for different numbers of targets appearing in the input samples.

Finally, the performance of HopSAC and LS estimators for multiple target detection is evaluated. FIG. 10 shows the target detection probability for different numbers of targets appearing in the input samples. The number of input samples $N_s$ increases proportionally with the number of targets $N_t$ in the same acquiring interval $T_s=0.5$ s. In FIG. 10, it can be seen that certain embodiments in accordance with aspects of this disclosure achieve target detection probability greater than 0.994 for detecting up to 10 targets. The results confirm that HopSAC is consistent and performs well with multiple target detection. In contrast, LS is unable to detect anything in multiple target scenarios even with only two targets. In certain embodiments, the capability of techniques of this disclosure for detecting multiple targets lies in its ability to classify the outliers and inliers, associate each set of inlier samples to a specific target one by one, and extract outliers from all samples for the estimation of other targets. For this reason, the complexity of aspects of this disclosure grows linearly with the number of targets for detection. On the contrary, the LS estimator uses all samples for estimation regardless of the number of targets. The samples from transmissions of one target are outliers of other targets. Thus, the LS estimator is greatly affected by multiple target transmissions and is unable to accurately estimate the parameters in any multiple target scenarios.

In this disclosure, HopSAC frequency hopping parameter estimation methods and systems based on the RANSAC paradigm for drone detection systems 101 are disclosed. Aspects of this disclosure are shown to outperforms the LS method, and achieve virtually 100% estimation accuracy under the impact of gross errors, small timing errors, and the presence of multiple targets. The exceptional gross error rejection capability of this disclosure allows the drone detection system 101 to tolerate higher false positives with good detection performance in low SNR regions. Moreover, the robustness of aspects of this disclosure to timing errors significantly reduces response time and collateral damage while increasing the precision of transmissions and power efficiency. Finally, aspects of this disclosure excel in multiple target detection with exceptionally high detection probability at the expense of linearly increasing complexity.

Implementing Systems and Terminology

Implementations disclosed herein provide systems, methods and apparatus for detecting the presence of drones. It should be noted that the terms "couple," "coupling," "coupled" or other variations of the word couple as used herein may indicate either an indirect connection or a direct connection. For example, if a first component is "coupled" to a second component, the first component may be either indirectly connected to the second component via another component or directly connected to the second component.

The drone detection functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The previous description of the disclosed implementations is provided to enable any person skilled in the art to make or use the present invention. Various modifications to these implementations will be readily apparent to those skilled in the art, and the generic principles defined herein may be applied to other implementations without departing from the scope of the invention. For example, it will be appreciated that one of ordinary skill in the art will be able to employ a number corresponding alternative and equivalent structural details, such as equivalent ways of fastening, mounting, coupling, or engaging tool components, equivalent mechanisms for producing particular actuation motions, and equivalent mechanisms for delivering electrical energy. Thus, the present invention is not intended to be limited to the implementations shown herein but is to be accorded the widest scope consistent with the principles and novel features disclosed herein.

What is claimed is:

1. A system for detecting presence of one or more drones, the system comprising:
a radio-frequency (RF) receiver configured to receive a first RF signal transmitted between a first drone and a first drone controller, the first RF signal including a first frequency hopping sequence defined by a plurality of first frequency hopping parameters;
a processor; and
a non-transitory computer-readable memory in communication with the processor and having stored thereon computer-executable instructions to cause the at least one processor to:
receive a set of samples from the RF receiver for a time interval, the set of samples comprising samples of the first RF signal,
obtain a parameter model that represents the first frequency hopping sequence transmitted between the first drone and the first drone controller, the parameter model comprising a plurality of model parameters respectively modelling the first frequency hopping parameters,
fit the parameter model to the set of samples by iterating over the following:
randomly selecting a first plurality of the samples from the set of samples,
estimating values of the plurality of model parameters based on the selected first plurality of the samples,
constructing a first instance of the parameter model, the first instance of the parameter model comprising the estimated values of the plurality of model parameters, and
classifying the first plurality of the samples as inliers or outliers by evaluating fitting errors between the first plurality of the samples and the constructed first instance of the parameter model,
selecting one of the first instances of the parameter model based on the inliers and outliers for each of the constructed first instances of the parameter model, and
identifying the first drone based on the selected first instance of the parameter model.

2. The system of claim 1, wherein the RF receiver is further configured to receive a second RF signal transmitted between a second drone and a second drone controller, the second RF signal including a second frequency hopping sequence defined by a plurality of second frequency hopping parameters, wherein the set of samples further comprises samples of the second RF signal, and wherein the computer-readable memory further has stored thereon computer-executable instructions to cause the at least one processor to:
fit the parameter model to a subset of the set of samples corresponding to the outliers that do not fit the selected first instance of the parameter model by iterating over the following:
randomly selecting a second plurality of samples from the subset,
estimating the values of the plurality of model parameters based on the selected second plurality of samples,
constructing a second instance of the parameter model based on the estimated values of the plurality of model parameters, and
classifying the second plurality of the samples as inliers or outliers by evaluating fitting errors between the second plurality of the samples and the second instance of the parameter model,
selecting one of the second instances of the parameter model based on the inliers and outliers for each of the constructed second instances of the parameter model, and
identifying the second drone based on the selected second instance of the parameter model.

3. The system of claim 1, wherein the estimating of the values of the plurality of model parameters is further based on a set of predefined channel center frequencies.

4. The system of claim 3, wherein the plurality of first frequency hopping parameters comprise a start time of a first hop, a hop period between two neighboring hops, a start frequency of a first hop after an initial time, a frequency difference between the two neighboring hops, and a number of channels.

5. The system of claim 1, wherein the classifying of the first plurality of the samples as inliers or outliers comprises:
   determine a time fitting error and a frequency fitting error for each sample of the first plurality of the samples based on the constructed first instance of the parameter model,
   determine a combined fitting error for each sample of the first plurality of the samples based on the time fitting error and the frequency fitting error of the corresponding sample, and
   classify each sample of the first plurality of the samples as the inlier or the outlier based on a comparison of the corresponding combined fitting error to a fitting error threshold.

6. The system of claim 1, wherein the constructed first instance of the parameter model having a greatest number of inliers is selected.

7. The system of claim 1, wherein the parameter model comprises a model of one of the following: a linear frequency hopping sequence, a pseudo random frequency hopping sequences, a non-linear frequency hopping sequences, and an arbitrary linear frequency hopping sequence.

8. The system of claim 1, further comprising:
   a jammer configured to receive the estimated values of the plurality of model parameters and generate a jamming RF signal to disrupt communication between the first drone and the first drone controller based on the estimated values of the plurality of model parameters.

9. A method for detecting presence of a drone, the method comprising:
   receiving a set of samples for a time interval, the set of samples comprising samples of a first RF signal transmitted between a first drone and a first drone controller, the first RF signal including a first frequency hopping sequence defined by a plurality of first frequency hopping parameters;
   obtaining a parameter model that represents the first frequency hopping sequence transmitted between the first drone and the first drone controller, the parameter model comprising a plurality of model parameters respectively modelling the first frequency hopping parameters;
   fitting the parameter model to the set of samples by iterating over the following:
      randomly selecting a first plurality of the samples from the set of samples,
      estimating values of the plurality of model parameters based on the selected first plurality of the samples,
      constructing a first instance of the parameter model, the first instance of the parameter model comprising the estimated values of the plurality of model parameters, and
      classifying the first plurality of the samples as inliers or outliers by evaluating fitting errors between the first plurality of the samples and the constructed first instance of the parameter model;
   selecting one of the first instances of the parameter model based on the inliers and outliers for each of the constructed first instances of the parameter model; and
   identifying the first drone based on the selected first instance of the parameter model.

10. The method of claim 9, wherein the set of samples further comprises samples of a second RF signal transmitted between a second drone and a second drone controller, the second RF signal including a second frequency hopping sequence defined by a plurality of second frequency hopping parameters, wherein the method further comprises:
   fitting the parameter model to a subset of the set of samples corresponding to the outliers that do not fit the selected first instance of the parameter model by iterating over the following:
      randomly selecting a second plurality of samples from the subset,
      estimating the values of the plurality of model parameters based on the selected second plurality of samples,
      constructing a second instance of the parameter model based on the estimated values of the plurality of model parameters, and
      classifying the second plurality of the samples as inliers or outliers by evaluating fitting errors between the second plurality of the samples and the second instance of the parameter model;
   selecting one of the second instances of the parameter model based on the inliers and outliers for each of the constructed second instances of the parameter model; and
   identifying the second drone based on the selected second instance of the parameter model.

11. The method of claim 9, wherein the estimating of the values of the plurality of first frequency hopping parameters is further based on a set of predefined channel center frequencies.

12. The method of claim 11, wherein the plurality of first frequency hopping parameters comprise a start time of a first hop, a hop period between two neighboring hops, a start frequency of a first hop after an initial time, a frequency difference between the two neighboring hops, and a number of channels.

13. The method of claim 9, wherein the classifying of the first plurality of the samples as inliers or outliers comprises:
   determining a time fitting error and a frequency fitting error for each sample of the first plurality of the samples based on the constructed first instance of the parameter model;
   determining a combined fitting error for each sample of the first plurality of the samples based on the time fitting error and the frequency fitting error of the corresponding sample; and
   classifying each sample of the first plurality of the samples as the inlier or the outlier based on a comparison of the corresponding combined fitting error to a fitting error threshold.

14. The method of claim 9, wherein the constructed first instance of the parameter model having a greatest number of inliers is selected.

15. The method of claim 9, wherein the parameter model comprises a model of one of the following: a linear frequency hopping sequence, a pseudo random frequency hopping sequences, a non-linear frequency hopping sequences, and an arbitrary linear frequency hopping sequence.

16. A non-transitory computer readable storage medium having stored thereon instructions that, when executed, cause a computing device to:

receive a set of samples for a time interval, the set of samples comprising samples of a first RF signal transmitted between a first drone and a first drone controller, the first RF signal including a first frequency hopping sequence defined by a plurality of first frequency hopping parameters;

obtain a parameter model PM that represents the first frequency hopping sequence transmitted between the first drone and the first drone controller, the parameter model comprising a plurality of model parameters respectively modelling the first frequency hopping parameters;

fit the parameter model to the set of samples by iterating over the following:
 randomly selecting a first plurality of the samples from the set of samples,
 estimating values of the plurality of model parameters based on the selected first plurality of the samples,
 constructing a first instance of the parameter model, the first instance of the parameter model comprising the estimated values of the plurality of model parameters, and
 classifying the first plurality of the samples as inliers or outliers by evaluating fitting errors between the first plurality of the samples and the constructed first instance of the parameter model;

select one of the first instances of the parameter model based on the inliers and outliers for each of the constructed first instances of the parameter model; and identify the first drone based on the selected first instance of the parameter model.

17. The non-transitory computer readable storage medium of claim 16, wherein the set of samples further comprises samples of a second RF signal transmitted between a second drone and a second drone controller, the second RF signal including a second frequency hopping sequence defined by a plurality of second frequency hopping parameters, wherein the instructions, when executed, cause the at least one computing device to:

fit the parameter model to a subset of the set of samples corresponding to the outliers that do not fit the selected first instance of the parameter model by iterating over the following:
 randomly selecting a second plurality of samples from the subset,
 estimating the values of the plurality of model parameters based on the selected second plurality of samples,
 constructing a second instance of the parameter model based on the estimated values of the plurality of model parameters, and
 classifying the second plurality of the samples as inliers or outliers by evaluating fitting errors between the second plurality of the samples and the second instance of the parameter model;

select one of the second instances of the parameter model based on the inliers and outliers for each of the constructed second instances of the parameter model; and identify the second drone based on the selected second instance of the parameter model.

18. The non-transitory computer readable storage medium of claim 16, wherein the estimating of the values of plurality of first frequency hopping parameters is further based on a set of predefined channel center frequencies.

19. The non-transitory computer readable storage medium of claim 18, wherein the plurality of first frequency hopping parameters comprise a start time of a first hop, a hop period between two neighboring hops, a start frequency of a first hop after an initial time, a frequency difference between the two neighboring hops, and a number of channels.

20. The non-transitory computer readable storage medium of claim 16, wherein the classifying of the first plurality of the samples as inliers or outliers comprises:

determine a time fitting error and a frequency fitting error for each sample of the first plurality of the samples based on the constructed first instance of the parameter model;

determine a combined fitting error for each sample of the first plurality of the samples based on the time fitting error and the frequency fitting error of the corresponding sample; and classify each sample of the first plurality of the samples as the inlier or the outlier based on a comparison of the corresponding combined fitting error to a fitting error threshold.

* * * * *